US007265755B2

(12) United States Patent
Peterson

(10) Patent No.: US 7,265,755 B2
(45) Date of Patent: Sep. 4, 2007

(54) METHOD AND SYSTEM FOR DYNAMIC VISUALIZATION OF MULTI-DIMENSIONAL DATA

(75) Inventor: Bruce A. Peterson, Redmond, WA (US)

(73) Assignee: Terastat, Inc., Redmond, WA (US)

( * ) Notice: Subject to any disclaimer, the term of this patent is extended or adjusted under 35 U.S.C. 154(b) by 331 days.

(21) Appl. No.: 10/739,897

(22) Filed: Dec. 17, 2003

(65) Prior Publication Data

US 2004/0183800 A1 Sep. 23, 2004

Related U.S. Application Data

(60) Provisional application No. 60/485,652, filed on Jul. 10, 2003, provisional application No. 60/434,219, filed on Dec. 17, 2002.

(51) Int. Cl.
*G06T 11/20* (2006.01)
(52) U.S. Cl. ..................................... 345/440
(58) Field of Classification Search .............. 345/473, 345/440; 715/700
See application file for complete search history.

(56) References Cited

U.S. PATENT DOCUMENTS

| | | | | |
|---|---|---|---|---|
| 6,034,697 | A | 3/2000 | Becker | 345/433 |
| 6,100,901 | A * | 8/2000 | Mohda et al. | 345/440 |
| 6,232,984 | B1 | 5/2001 | Chuah et al. | 345/441 |
| 6,362,823 | B1 | 3/2002 | Johnson et al. | 345/440 |
| 6,480,194 | B1 | 11/2002 | Sang'udi et al. | 345/440 |
| 7,071,940 | B2 * | 7/2006 | Malik | 345/440 |
| 7,085,693 | B2 * | 8/2006 | Zimmerman | 703/6 |
| 2002/0171646 | A1 | 11/2002 | Kandogan | 345/440 |
| 2003/0030634 | A1 | 2/2003 | Sang'udi et al. | 345/418 |
| 2003/0140101 | A1 | 7/2003 | Kunugi et al. | 709/203 |
| 2004/0085316 | A1 * | 5/2004 | Malik | 345/440 |

FOREIGN PATENT DOCUMENTS

WO  WO99/27495  6/1999

* cited by examiner

*Primary Examiner*—Kee M. Tung
*Assistant Examiner*—J. Amini
(74) *Attorney, Agent, or Firm*—Seed IP Law Group PLLC

(57) ABSTRACT

Methods and systems for dynamic visualization of highly dimensional data are provided. Example embodiments provide a Dynamic Visualization System (a "DVS"), which maps data attributes to visualization dimensions and automatically imputes attribute values on-the-fly for each value of a sequencing dimension. Data having different resolutions can be simultaneously displayed in the same visualization. In one embodiment, the DVS comprises a Dynamic Data Management System with a user interface for specifying and mapping attributes, and one or more Dynamic Visualization Engines with near real-time control user interfaces. These components cooperate to define visualization scenarios based upon specified data subsets, determine and automatically execute a defined visualization, and allow analysts and other users to interactively modify the visualization.

117 Claims, 28 Drawing Sheets
(13 of 28 Drawing Sheet(s) Filed in Color)

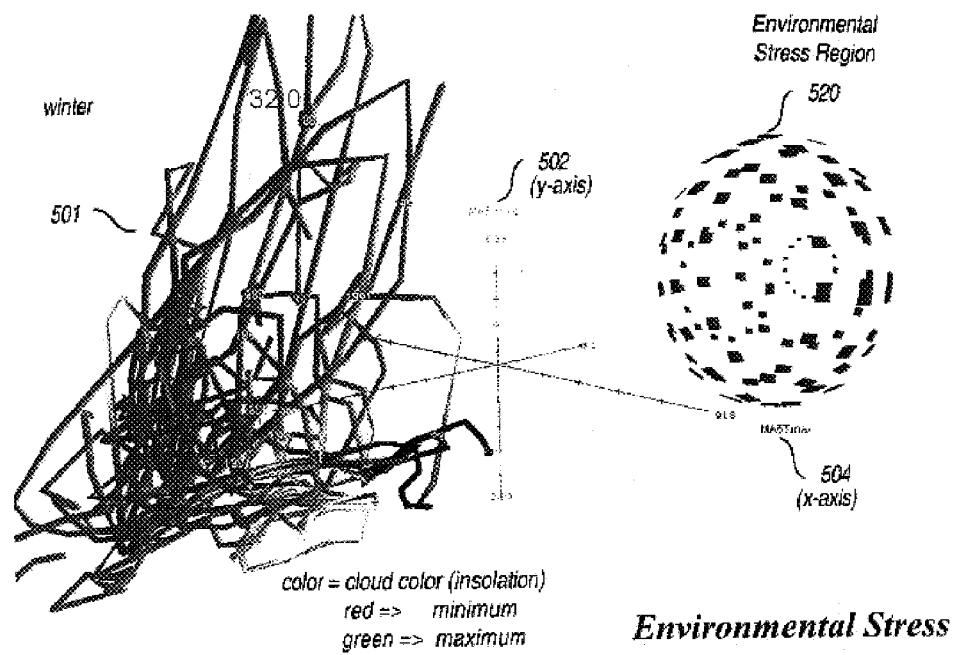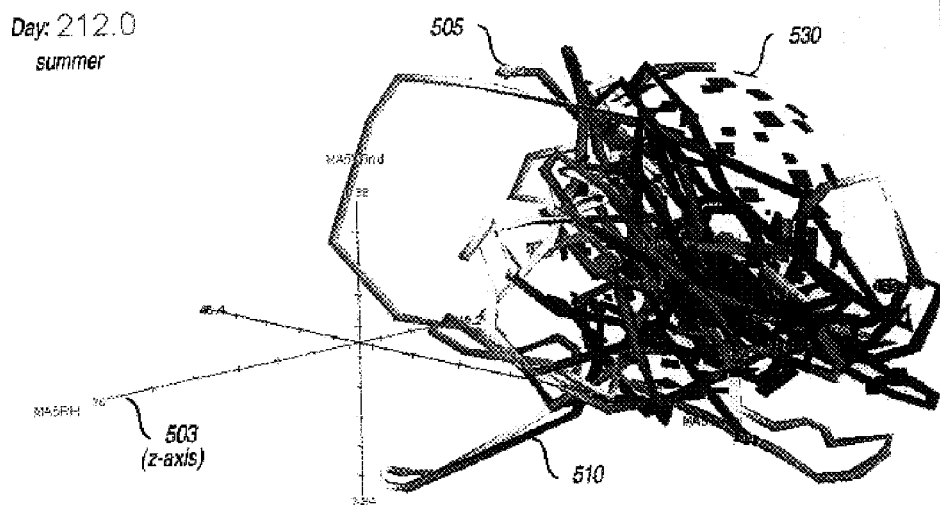
Fig. 5

Scenario Attribute Description File

| 901 | 902 |
|---|---|
| ATCatField | Attribute table categorical field name |
| ATCatVal | Attribute table categorical value |
| ATClassField | Attribute table class field name |
| ATClassVal | Attribute table class field value |
| ATObjKey | Attribute table object key field name |
| Attribute_Table | Attribute table name |
| C_dist | Summary distribution of color values |
| DataBase | Database name |
| FQN | Fully qualified name of scenario in use |
| HRCfield | High resolution table color field name |
| HRObjKey | High resolution table object key field name |
| HRPfield | High resolution table pattern field name |
| HRSfield | High resolution table shape field name |
| HRTime | High resolution table range of time-like values |
| HRTimeField | High resolution table time-like field name |
| HRXfield | High resolution table field assigned to X axis |
| HRYfield | High resolution table field assigned to Y axis |
| HRZfield | High resolution table field assigned to Z axis |
| HighRes_Table | High resolution table name |
| LRCfield | Low resolution table color field name |
| LRObjKey | Low resolution table object key field name |
| LRPfield | Low resolution table pattern field name |
| LRSfield | Low resolution table shape field name |
| LRTime | Low resolution table range of time-like values |
| LRTimeField | Low resolution table time-like field name |
| LRXfield | Low resolution table field assigned to X axis |
| LRYfield | Low resolution table field assigned to Y axis |
| LRZfield | Low resolution table field assigned to Z axis |
| LowRes_Table | Low resolution table name |
| Scenario | Root name of scenario |
| X_dist | Summary distribution of X field values |
| Y_dist | Summary distribution of Y field values |
| Z_dist | Summary distribution of Z field values |

*Fig. 9*

| Scenario Number | 1 | | | Display Visualization | | | |
|---|---|---|---|---|---|---|---|
| Display Width | 1024 | | | | | | |
| Display Height | 768 | | | Data Summary | | | |
| | | | | LC600MedD | | | |
| | | Attribute Table | | Low Resolution Table | | High Resolution Table | |
| | | StockData.lc600ratdata | | StockData.lc600rat data | | StockData.lc600p rices | |
| Number of Object keys | 35 | | | | | | |
| Low Resolution Time | 40 | Min Value | Max Value | | | | |
| High Resolution Time | 3060 | 3/31/1997 0:00 | 12/31/2002 0:00 | | | | |
| | | 1/2/1997 | 1/31/2003 | | | | |
| | table.field | Min | 10% | 25% | 50% | 75% | 90% | Max |
| X coordinate | lc600ratdata.Net_margin_12m | -5.650E+02 | -4.500E+00 | -2.600E+00 | 5.900E+00 | 1.010E+01 | 1.600E+01 | 4.620E+01 |
| Y coordinate | lc600ratdata.Current_ratio_Q1 | 0.000E+00 | 0.000E+00 | 7.000E-01 | 1.300E+00 | 1.900E+00 | 2.500E+00 | 1.790E+01 |
| Z coordinate | lc600ratdata.EPS_Continuing_q1 | -1.004E+01 | -1.800E-01 | 1.400E-01 | 3.300E-01 | 7.100E-01 | 1.130E+00 | 3.920E+00 |
| Color | lc600prices.pricechange | -4.237E-01 | -2.782E-02 | -1.351E-02 | 0.000E+00 | 1.313E-02 | 2.862E-02 | 6.101E-01 |
| Shape | | | | | | | | |
| Pattern | | | | | | | | |
| | | Min | | Center | Max | Scale | | |
| X Axis | | -4.5 | | 5.9 | 16.00002825 | 0.1 | | |
| Y Axis | | 0 | | 1.3 | 2.500028249 | 1 | | |
| Z Axis | | -0.18 | | 0.33 | 1.13 | 1 | | |

*Fig. 10*

Dynamic Visualization Engine API

Initiate
Terminate
setAxes
putindex
getindex
putframerate
getframerate
startrecord
stoprecord
putstep
getstep
getobjlist
getfieldnames
settargobject
settraillen
gettraillen
settrailthickness
setimputetype
getimpute
getimputetypes
setfontsize
setcolorscheme
setshapeschem
getcolorschemes
getshapelist
setzonetype
setzonemena
setzonesize
setzoneupdate
getzonetypes
setzonetrack
getzonelist
setbackground
getscale
setspinview
getspinview
setlabelsize
getlabelsize

*Fig. 19*

METHOD AND SYSTEM FOR DYNAMIC VISUALIZATION OF MULTI-DIMENSIONAL DATA

BACKGROUND OF THE INVENTION

1. Field of the Invention

The present invention relates to methods and systems for the display of multi-dimensional data and, in particular, to methods and systems for dynamically determining and presenting appearance and spatial attribute values of entities of the multi-dimensional data over a sequence to assist in the recognition of patterns and trends within the data.

2. Background Information

One of the consequences of the increasing computerization and digitization of almost all human activities is the presence of vast quantities of complex data. While capturing multiple aspects of activities and phenomena is becoming easier, comprehending the data so acquired is increasingly challenging.

The process of comprehending data involves the reduction of the data by a human to a series of mental representations of the data, often fitting these representations into a pre-existing mental model. The mental model abstracting the data enables the data user to make decisions and take or avoid actions based on the model and the user's projection of its consequences. Such models necessarily simplify the data. The same data may support several different models based on differing presuppositions.

Abstract data is commonly used in business and technical pursuits. Such data consists of categories, rankings, and real valued measurements gathered by people or machines. Standard methods have been developed for organizing, summarizing, and presenting such data, for example, tables, statistics, and graphics. Standard methods have also been developed for organizing the storage and retrieval of such data such as hierarchical, relational, and object oriented databases as well as non-database methods such as "flat" files, spreadsheets, or other data structures.

Collecting, storing and accessing data is only the beginning of process of turning raw (abstract) data into valuable information. In any large-scale data collection process, it is inevitable that errors will occur. Data values may be corrupted or omitted. Entire records may be lost or duplicated. While some types of errors may be identified by routine data operations, other types of errors will only be found during analysis, necessitating correction of the database (or equivalent data structure) and reanalysis. Thus, managing the database that stores the raw data is an active process that requires continuing attention to maintain data quality.

Large databases are often considered as "high dimensional" data (or "highly dimensional" or "multi-dimensional" data). This terminology stems from the ability to plot real valued data as scatter plots. Assigning one database variable to the abscissa (x-axis) of a graph and another database variable to the ordinate (y-axis) of the graph creates the simplest form of scatter plot. A dot is then drawn at the corresponding value pair for each database record. By extension, theoretically, each variable in a database could be assigned to a coordinate (dimension) of the graph and values plotted for all records. Such a representation is physically impossible to realize when the number of dimensions becomes large; however it provides a mental framework for further operations on the database.

The terminology used for describing databases differs among analysts; but generally reflects the mental model of a "table" of data. Modern databases seldom consist of a single table of data values. However, in general, a view of the database contents can be created that appears to be a table of data values. The columns of the conceptual table of data may be called variables, fields, or attributes; generally reflecting different measurements or categories. The rows of the conceptual table may be called records, cases, or observations; generally reflecting instances of measurement or categorization.

Database management systems provide basic database operations, such as storage and retrieval of records based upon selection criteria or filters. Analysis software provides other more advanced types of database operations. Basic operations include entering, updating, deleting and retrieving sets of data from the database. More advanced operation include creating new attributes by transforming original attributes or aggregating sets of attributes or records.

A combination of database operations and graphical display techniques are used to build an intuitive "feel" for data, examine how well putative models perform, identify database errors, and examine relationships among data subsets. Graphical representation tools are highly useful in maintaining and analyzing data. In existing systems, there are a number of graphical formats used to display data two attributes at a time. Three or more attributes are displayed as scatter plots, contour plots, and surface plots among others. In these plots time or an other index attribute is displayed as one coordinate in a static display.

Even using the combination of complex database operations and graphical display techniques, it is difficult to gain an understanding of highly dimensional data because there are simply too many values to mentally track or plot. Thus, highly dimensional data is typically reduced using data transformations to a form that can be displayed with current graphical methods. For example, transforming data by aggregating across variables reduces data dimensionality by creating new variables that summarize several original variables. As a specific example, sales and expenses may be recorded in a corporate database, whereas the difference of the two representing a profit or loss may be more meaningful in a business model and can serve to reduce the amount of data being viewed.

Also, in many data sets, a multitude of dependent variables can be transformed into fewer new independent variables that represent most of the information. Specifically, when each variable in a dataset conceptually corresponds to a dimension or coordinate of some highly dimensional space, it is implicitly assumed that all the variables are orthogonal (uncorrelated or independent). This is seldom true for most data sets. Statistical techniques such a "principle components" or "factor analysis" may be used to define new variables consisting of weighted linear aggregations of the original variables. These new variables are orthogonal and a relative few are needed to typically capture most of the information in the data set.

However, the greater the dimensionality reduction obtained through aggregation and other transformations using these tools, the more information that is lost. The ability to characterize a data set is thus limited by the amount of reduction required to visualize the data using existing tools.

Numerous database management systems and statistical analysis packages are available to perform such transformation and analysis operations. Database management systems typically use a query language such as SQL (structured query language) to allow users to create subsets (views) of the data for analysis. Statistical software provides an interactive user interface for data manipulation and analysis. A user typically runs the statistical software to interface to the data management system to retrieve data subsets, which are then stored and analyzed in a proprietary format of the statistical software.

Once the data is organized and manipulated for viewing, it must still be analyzed to extract information. The major activities of the data analyst may be characterized by model fitting or data exploration. In model fitting, a predefined model exists and the data is used to calculate or pick the parameters of the model, for example, to predict outcomes. In data exploration, visual methods are often used to summarize the data with a goal of identifying an appropriate model. In practice, especially for highly dimensional data, both activities are performed iteratively with models being selected and fit and then discarded for a new model as understanding of the data set improves. The pace at which this process can proceed is limited by the availability of visualization tools that aid the data analyst in viewing the data.

The exponential growth of the computer processing power available for data modeling and graphical data exploration is used by current tools merely to display larger data sets faster. Thus, current data visualization software continues to have several limitations. One limitation is ease of using the software. The ease of use of visualization software is in part limited by the need for the user to pre-process data to align all attributes on the same index. For example, if a multivariate time series is to be visualized, the user must first ensure that all the times match so that data is available at each time index. If data is missing, the user is responsible for specifying how missing data is managed (e.g., deleting the associated record, replacement with mean value, etc.) and performing the operation before visualization can begin.

In addition, currently available software is typically limited to interaction with static data sets. A selected data set can be displayed and the data points queried interactively (often called brushing in the literature). Indexed data (e.g., a time series) requires the set-up of the visualization followed by the generation of an animation. When viewed the animation permits no interaction.

For example, some commercial analysis packages such as Statistica™ (Statsoft, inc.), SAS™ (SAS inc), Splus™ (Insightful, Inc.), and others display changes to data through limited animation facilities that consist of creating a series of plots based on an index variable (which may be an attribute in the data set) and linking these static plots together into an animation. The animation is then viewed. The viewing and interaction with the display is done in a sequence of batch steps: creating a graphic view of the data, indexing this view on some derived variable or attribute, creating a sequence of views, and then viewing sequence as animation. If any changes are desired, the sequence is repeated beginning with regenerating the views of the data.

A major interest in sequential or indexed data is how the relationships among attributes for a set of categories change with the index. In current practice, an animated visualization shows only the current values of changing relationships. Thus, to attempt to see changes over the index values, the user typically views the animation as a continuous loop in the hope that repetition will illuminate the details.

BRIEF SUMMARY OF THE INVENTION

Embodiments of the present invention provide computer- and network-based methods and systems for dynamically determining and presenting appearance and spatial attribute values of subsets of multi-dimensional data over an index (a sequence) to assist in the recognition of patterns and trends within the data. Example embodiments provide a Dynamic Visualization System for the presentation of multi-dimensional data (a "DVS"), which enables users to identify patterns and trends in highly dimensional data by observing dynamically determined data values that are portrayed, for example, animated over some sequence such as a time-valued index. The dynamically determined data values are imputed in near real-time using functions that are based upon actual data attribute values.

The Dynamic Visualization System defines subsets of the multi-dimensional data to be displayed as data entities; maps data attributes to visualization dimensions that can be presented to the user; and automatically portrays representations (e.g., animations) of dynamically determined imputed values for each mapped data attribute. In addition, the DVS supports the specification of visual filters for triggering events when data subsets match desired criteria. Also, the DVS provides near real-time control of display parameters and object parameters to which the presentations respond so that changes to data subsets can be immediately and dynamically observed.

In one example embodiment, the Dynamic Visualization System comprises one or more functional components/ modules that work together to provide dynamic visualizations. For example, a Dynamic Visualization System may comprise a Dynamic Data Management System ("DDMS") and one or more Dynamic Visualization Engines. The DDMS is responsible for interfacing to the stored data and for creation of the DVEs. In addition, the DDMS provides an Attribute Selection and Mapping User Interface to define a data subset scenario by identifying data entities and attributes and mapping attributes to visualization dimensions such as spatial dimensions, appearance dimensions, and sequence dimensions. Each Dynamic Visualization Engine ("DVE") is responsible for managing a scenario regarding a subset of data stored in one or more databases. The databases may be part of the DVS, or they may be separately managed and accessible through a component such as a Database Management System. Each DVE manages the representations of the data entities that are defined by the scenario including automatically updating and presenting each data entity representation according to each value of a sequence attribute. For example, the DVE may present these representations in the form of animations that are updated for each value of the sequence. A (near) Real-Time Control Interface is provided for each DVE to adjust values of the representations and display parameters. The Real-Time Control Interface can also be used to create visual filters for identifying particular data entities that match desired criteria.

According to one approach, the representations are dynamically determined by imputing values from the actual data on-the-fly. Imputation functions and/or models are utilized that incorporate univariate functions, multivariate functions that use data from a plurality of data entities, or functions that preserve statistical characteristics of data entity data. Functions that require parameter fitting, typically use actual values from the underlying data to fit parameters.

In some approaches, the representations are presented on a display screen in the form of an animation over values of a sequence attribute of the underlying data. According to another approach, the representations are portrayed in audio form. In some approaches, the data attribute values displayed have been specified originally according to different data resolutions and are still displayed together.

Also, trails that indicate a data object's prior visualization history can be displayed along with the display object's graphical representation (e.g., a shape, icon, or glyph). These trails can be used to show movement in one of the spatial dimensions as well as change in the data object's appearance dimensions over the sequence dimension. Trails can be implemented as objects and have characteristics that correspond to the magnitude of change in some dimension.

In one approach, a visual filter can be defined to identify data objects that meet certain criteria. The criteria may be defined according to spatial dimensions by demarcation of a convex shape or by other specification. Visual filters can detect a data object's entry into, exit from, coincidence with, and intersection with a convex or other geometric shape defined by the visual filter. Examples of such shapes include ellipsoids, rectangles, and spheres. Visual filters can be defined also in terms of appearance dimensions, such as a filter that detects color of data objects within a particular range.

According to yet another approach, the data object representation responds to interactive changes to spatial and appearance dimensions as well as changed data object attribute values.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 5 is an example display screen of a dynamic visualization of environmental data, dynamically constructed and automatically presented by a Dynamic Visualization Engine.

FIG. 9 is a list of example attribute definitions specified in an example Scenario Attribute Description file.

FIG. 10 is an example worksheet summary data file produced by a Dynamic Data Management System of an example Dynamic Visualization System to summarize attribute mappings.

FIG. 19 is a list of example methods of a Dynamic Visualization Engine object used to access and manage data objects and visualization presentations.

DETAILED DESCRIPTION OF THE INVENTION

Embodiments of the present invention provide computer- and network-based methods and systems for dynamically determining and presenting appearance and spatial attribute values of subsets of multi-dimensional data over an index (a sequence) to assist in the recognition of patterns and trends within the data. Example embodiments provide a Dynamic Visualization System for the presentation of multi-dimensional data (a "DVS"), which enables users to identify patterns and trends in highly dimensional data, without being forced to reduce the information being presented by using data transformations. This allows users whose experience with the data is not sufficiently sophisticated for mentally modeling the data through such data transformations to instead identify trends by observing dynamically determined data values that are portrayed, for example, animated, over some sequence such as time. The dynamically determined data values are imputed in near real-time using functions that are based upon actual data attribute values. The DVS also allows experienced data analysts finer control over the ability to select transformations that are useful, while minimizing loss of information, because fewer transformations are needed to successfully view the data.

The Dynamic Visualization System provides a mechanism for mapping data attributes to visualization dimensions that can be presented to the user and a dynamic visualization engine for portraying representations of dynamically determined values for the mapped data attributes. In one embodiment, the portrayed representations are animations in which changes to the attribute values over sequence values are presented as movement by the object through an "attribute space" defined by the mapped attributes. One skilled in the art will recognize that other representations are possible, such as representations based upon auditory effects.

Figure 1:
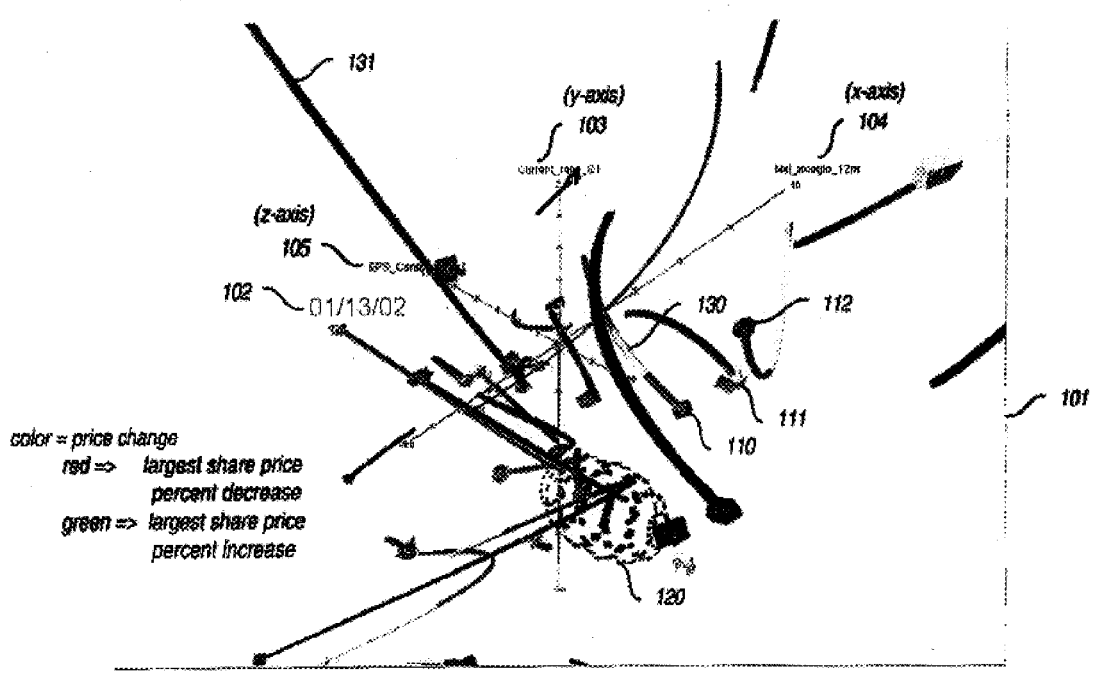
FIG. 1 is an example screen display of a point in time in an example animation as dynamically determined and presented by an example Dynamic Visualization System.

FIG. 1 is an example screen display of a point in time in an example animation as dynamically determined and presented by an example Dynamic Visualization System. The animation displayed in animation window 101 reflects the state of the data entities as of a single day "Jan. 13, 2002" shown as text label 102. The data objects presented in the animation window 101, for example data objects 110, 111, and 112, represent subsets of the data set that correspond to the data entities selected through one or more categorical attributes. In this scenario shown, the data objects correspond to different companies in different economic sectors whose financial attributes met certain criteria. The appearance of each data object is based upon values of attributes of the underlying data entity that are mapped to various appearance dimensions, such as shape (or glyph), color, size, etc., over a time-based index attribute. For example, the glyph used to represent of data objects 110, 111, and 112 is different and represents the economic sector; while the color of each data object reflects the percent change in daily stock price. Similarly, the displayed position of each data object is based upon values of attributes of the underlying data entity that are mapped to various spatial dimensions, such as a three-dimensional position defined by an x-axis, y-axis, and z-axis, over the same time-based index attribute. In this scenario, net margin values were mapped to the x-axis 104, current ratio values were mapped to the y-axis 103, and earnings per share values were mapped to the z-axis 105.

Although an arbitrary distinction, for ease of description, the "columns" of a conceptual table of data are referred to herein as "attributes," and the corresponding presentation parameters are referred to herein as "dimensions." Thus, for example, an attribute of financial data such as "expenses" may be mapped to a spatial parameter such as the x-axis. In general, the DVS supports multiple types of dimensions, termed "visualization dimensions," because they define parameters used to assist in the visualization of data. The visualization dimensions include spatial dimensions, such as the x-axis, y-axis, and z-axis; appearance dimensions, such as color, shape (glyph), size, pattern, texture, etc; and sequence dimensions such as a time-valued index. The display of very complex data can be made comprehensible through mapping various attributes of the data onto these visualization dimensions. Typically, a different data attribute is mapped to each dimension.

The dynamic visualization engine computes values for each mapped data attribute on-the-fly (as it is presented) based upon a sequence attribute, such as a time-valued index, and an imputation function associated with each attribute. This type of animation differs from traditional visualization methods used in prior systems, which provide animation by drawing in rapid succession a series of static images of the data that are pre-computed snapshots in time. Such traditional "animations" cannot respond to changes to values of the dimensions being displayed or changes to the attribute values while the animation is ongoing. These prior systems typically require stopping the animation, calculating new snapshots of the data to accommodate the new parameters, and then restarting an animation loop with the modified snapshots. In contrast, the animations and other representations supported by the DVS are responsive to changes in sequencing resolution (such as changing from a daily update to a weekly update, changes to the values of the dimensions being displayed (such as a change to the scale of the attribute mapped to the x-axis), to the position of such dimensions on a display (point of view), and to values of data attributes of a particular data object, because the data attribute values of all data objects are imputed on-the-fly.

More specifically, the automatic and dynamic nature of the Dynamic Visualization System allows data collected at different "resolutions" of the sequencing attribute to be appropriately mapped when it is presented, for example on a display window. For example, attributes that are collected daily (e.g., stock prices) can be presented simultaneously with attributes collected quarterly (e.g., financial performance figures). Such capabilities are made available by a DVS by providing a different type of imputation process for each attribute that automatically determines an appropriate value. For example, an imputation function for an attribute collected daily might compute an average over the days that comprise a quarter. Then, when this attribute is mapped to a visualization dimension whose value is updated based upon quarterly sequence values, the representations are determined and presented on a quarterly basis even though the underlying attribute values have been calculated daily. Simultaneously presenting data of heterogeneous resolutions thus frees the data analyst from only being able to view the data at its original resolution.

Also, the automatic and dynamic nature of the system allows the data to be viewed while adjustments are made to the presentation of each subset of data based upon receiving new display parameters. Example embodiments of the Dynamic Visualization System include a near real-time control interface, which can be used to change the values of display parameters, such as a range of an spatial axis currently being displayed. (This same control interface can also be used to modify particular attribute actual values for an identified data object.) The animation currently being presented by the DVS is accordingly modified to respond to these new values, as the animation is running. Moreover, prior states of the data (previous values of the data attributes) can be shown simultaneously with current values through the display of "history trails," which allows users to better examine and remember a complex series of data interactions. The appearance of history trails can be configured to also reflect information concerning how the data is changing over the sequence and not just a prior location of the data. For example, the object history trails such as trail 130 and 131 shown in FIG. 1 are different colors, which reflect the change in company financial performance, and are different lengths, which, in the example shown, correspond to the magnitude of change from calendar quarter to calendar quarter.

Example embodiments of a Dynamic Visualization System also provide visual filters that allow users to identify subsets of data having attribute values within certain ranges. Current database query methods that are used to identify such subsets are based on inequalities (e.g., identify all records where $x_0<X<x_1$, $y_0<Y<y_1$, $z_0<Z<z_1$) and filter results to return only data that satisfies these inequalities. In theory, these queries identify a rectangular solid of matching data in the data space. A DVS visual filter, when based upon spatial dimensions, provides the ability to "query" the data set based upon other convex shapes, such as ellipsoids, spheres, etc. The DVS displays a representation of a visual filter by delineating the convex regions that define the filter using demarcations such as outlines, color, shape, etc. where appropriate. A DVS visual filter can also be defined with disjoint sets of convex regions by separately delineating multiple convex regions for a single filter. When the values of attributes of a data entity intersect or coincide with a delineated region, then an event can be triggered such as logging a record of the data entity and its corresponding attribute values. Other events such as issuing notification messages and executing other programs (or other code modules) are also possible. In addition, events can be triggered to indicate that particular or all data entities do not intersect or coincide with the visual filter or are entering or exiting a delineated region.

An example of a visual filter is shown in FIG. 1. Visual filter 120 is an ellipsoidal shape and shown delineated using two-dimensional squares that give the appearance of a curved surface. Other demarcations are also possible. Note that although a visual filter 120 is shown using spatial dimensions, one skilled in the art will recognize that visual filters can also be defined for appearance dimensions. For example, a visual filter may specify that objects meet the filter criteria if they are a particular color or a particular shape. Appearance dimension based visual filters typically occur in conjunction with spatial dimension based visual filters; however, one skilled in the art will recognize that it is possible to specify an appearance-only based filter. In that case, there is no convex "shape" in a spatial location that defines entry and exit points for the visual filter. Rather, visualization of the visual filter might be accomplished by a "visual effect" on data objects that meets (or do not meet) the criteria. For example, data objects might flash when they coincide with the criteria.

Figure 2:
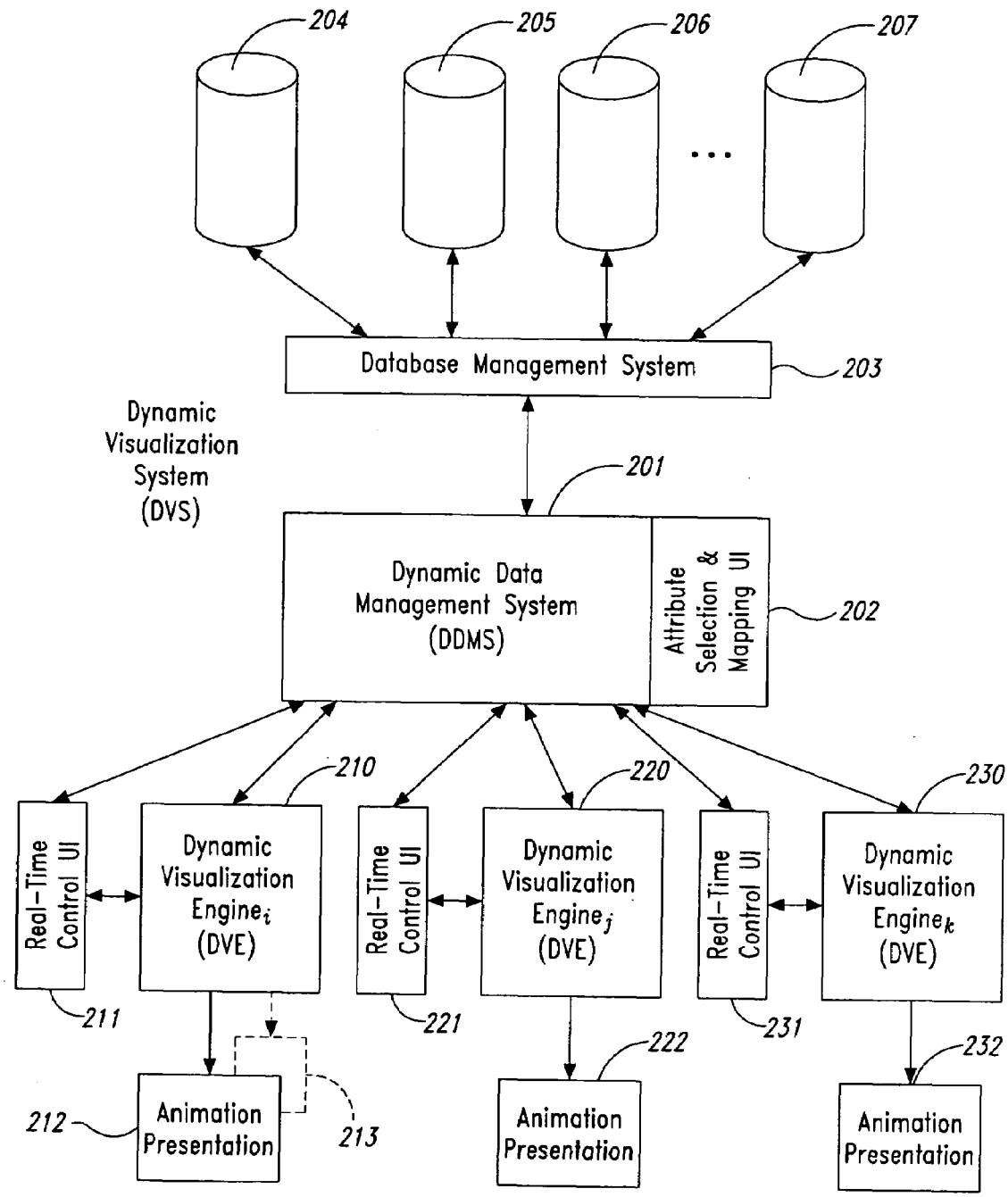
FIG. 2 is an example block diagram of components of an example Dynamic Visualization System.

FIG. 2 is an example block diagram of components of an example Dynamic Visualization System. In one embodiment, the Dynamic Visualization System comprises one or more functional components/modules that work together to create dynamic data visualizations. One skilled in the art will recognize that these components may be implemented in software or hardware or a combination of both. In FIG. 2, a Dynamic Visualization System comprises a Dynamic Data Management System (a "DDMS") 201, one or more instances of a Dynamic Visualization Engine (a "DVE"), such as engines 210, 220, and 230, and access to one or more data repositories 204–207. The data repositories may be part of the DVS, or they may be separately managed and accessible through a component such as a Database Management System/Server 203, or they may be some combination of both.

The DDMS 201 provides interfaces to the data stored in repositories 204–207 and is responsible for creation of the DVEs 210, 220, and 230. In addition, the DDMS 201 provides an Attribute Selection and Mapping User Interface 202 for defining a data subset scenario by identifying data entities, identifying attributes, and mapping the identified attributes to visualization dimensions such as spatial dimensions, appearance dimensions, and sequence dimensions.

Each Dynamic Visualization Engine ("DVE"), such as DVE 210, 220, and 230, is responsible for managing a scenario regarding a subset of data stored in the one or more data repositories 204–207. Each DVE manages the representations of the data entities that are defined by the scenario including automatically updating and presenting each data entity representation according to each value of a sequence attribute. For example, the DVE may present these representations in the form of animation presentations, such as animation presentations 212, 222, and 232, which are updated for each value of the sequence. A DVE may manage one or more simultaneous scenarios that are coordinated through the sequence values to allow a user to view different attribute effects at the same time for a given subset of data. These simultaneous scenarios are viewed through multiple animation presentations, such as animation presentations 212 and 213, controlled by the same DVE (e.g., DVE 210). A near Real-Time Control User Interface ("RTC"), such as RTC 211, 221, and 231, is provided for each DVE to adjust values of the data objects and display parameters. The near Real-Time Control User Interface can also be used to create visual filters for identifying particular data entities that match desired criteria.

Figure 3:
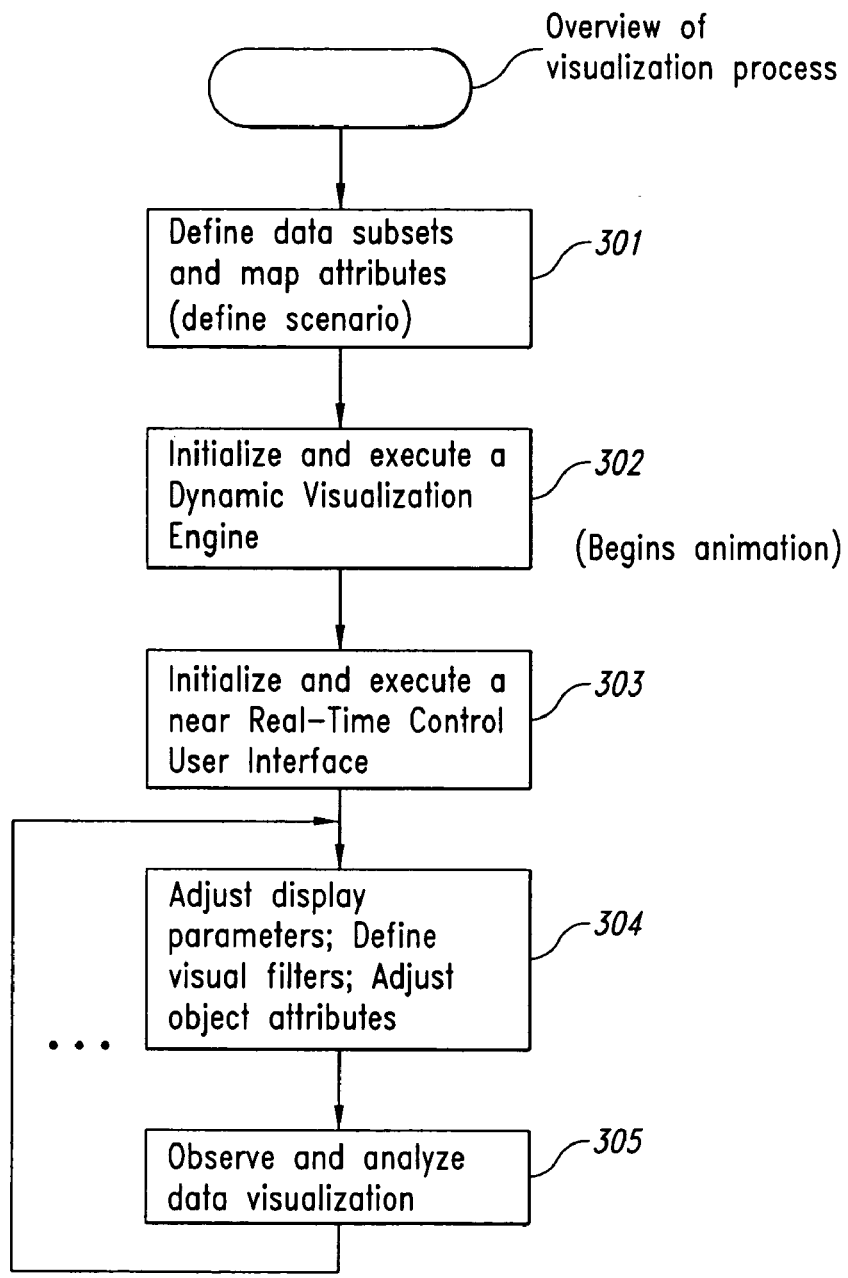
FIG. 3 is an example overview flow diagram of typical operations performed by a Dynamic Visualization System to produce multi-dimensional data visualizations.
Figure 4A:
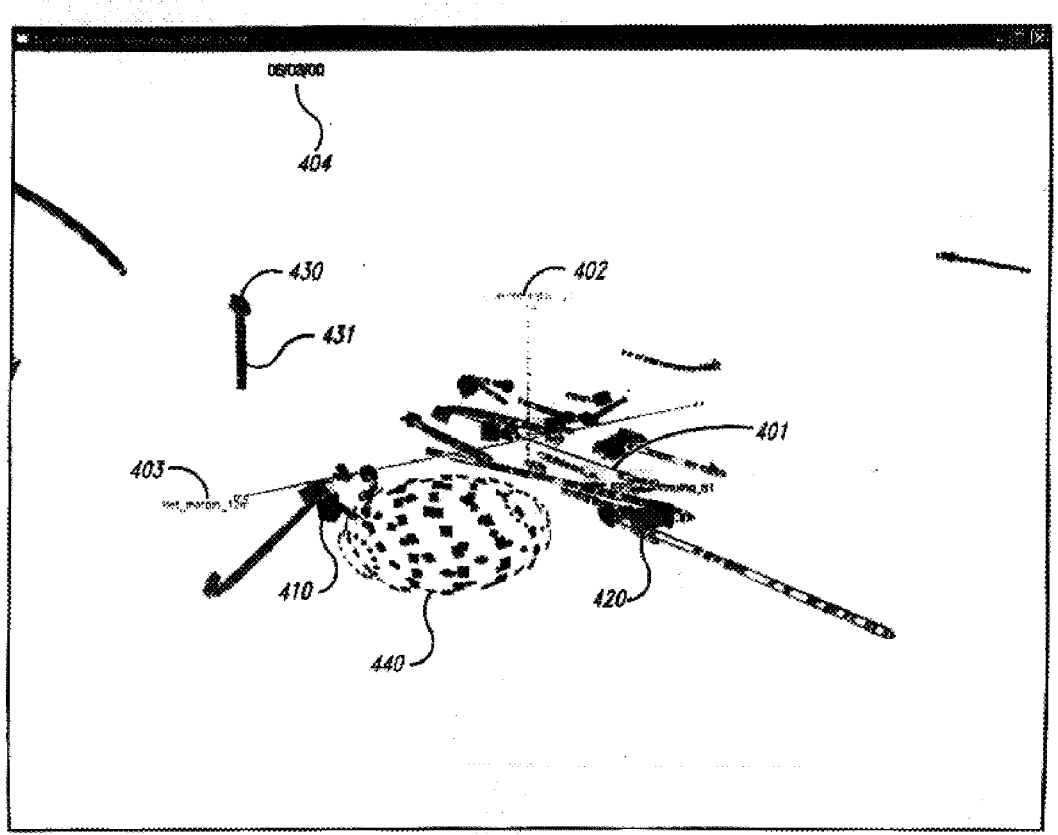
FIGS. 4A–4J present a series of example display screens of an example dynamic visualization of financial data that has been dynamically constructed and automatically presented by a Dynamic Visualization Engine.
Figure 4B:
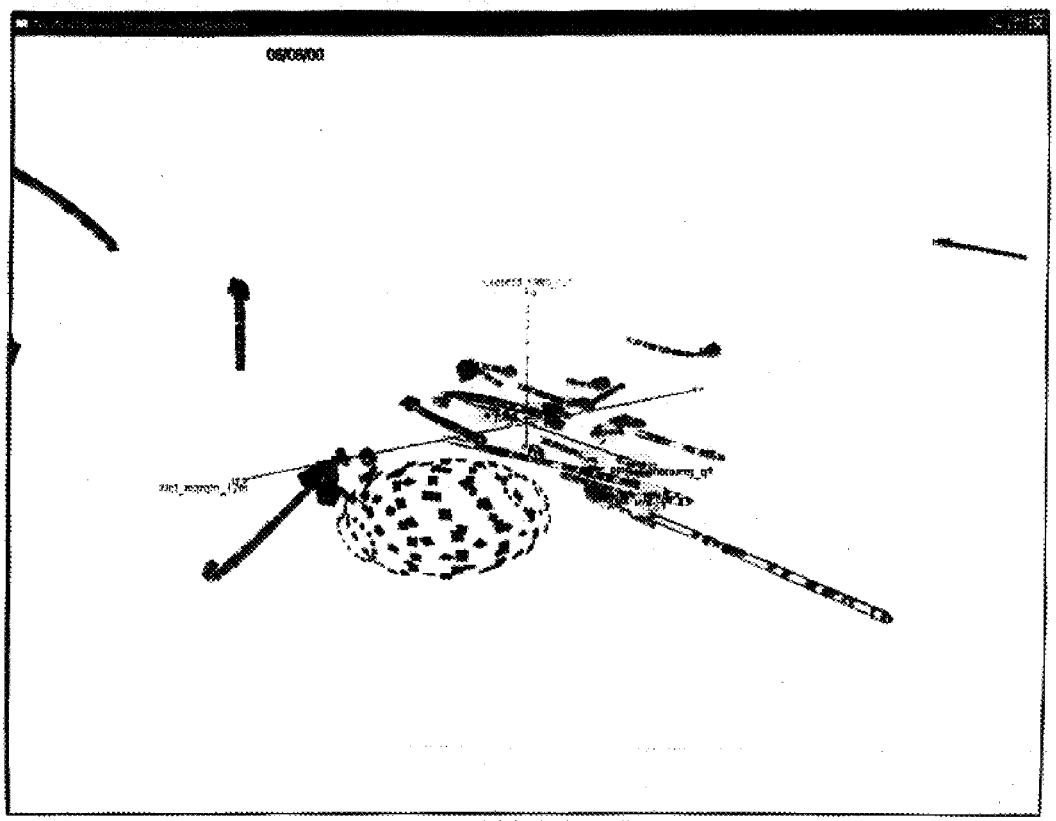
Figure 4C:
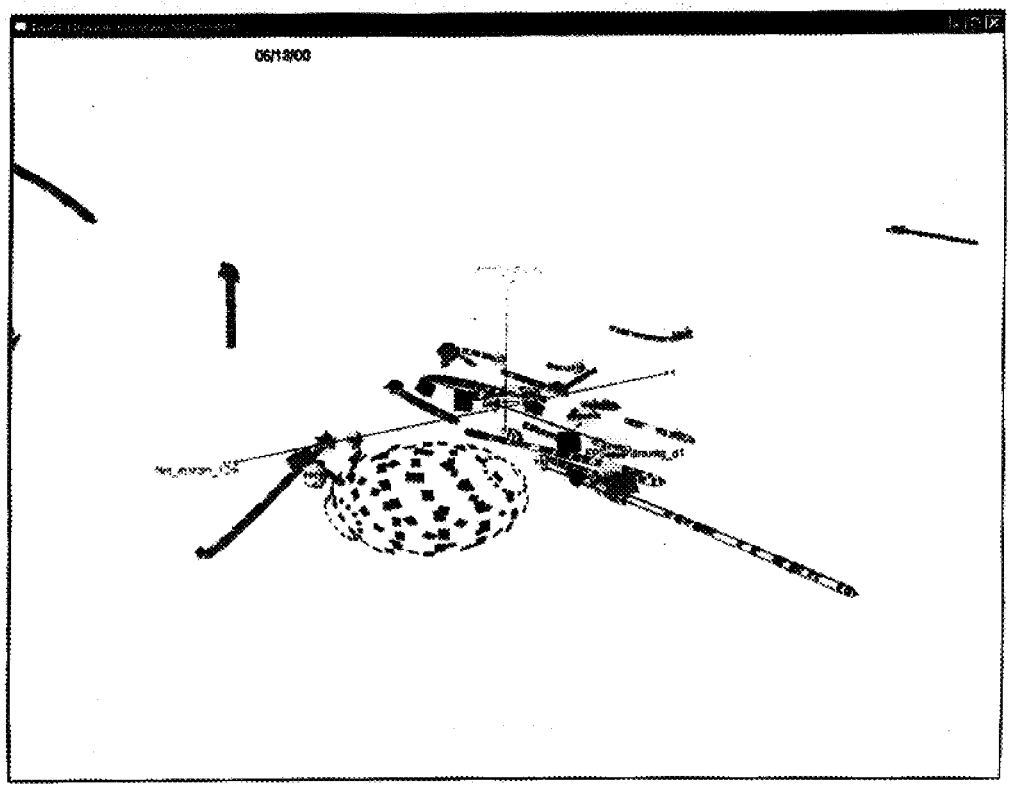
Figure 4D:
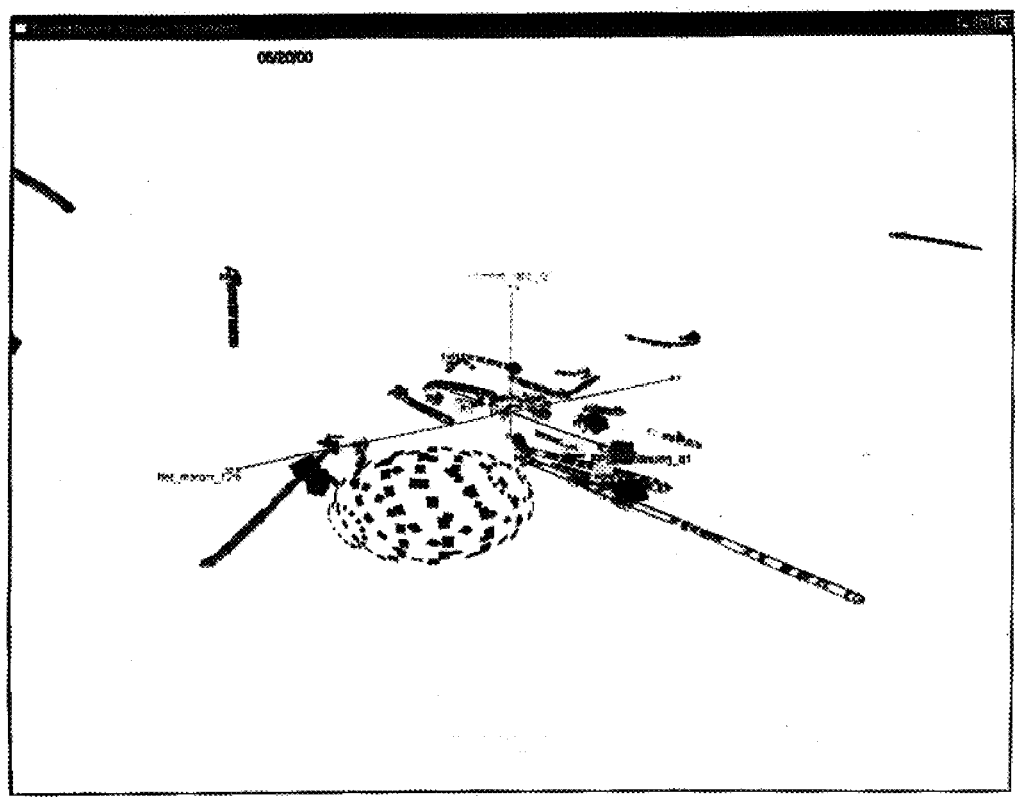
Figure 4E:
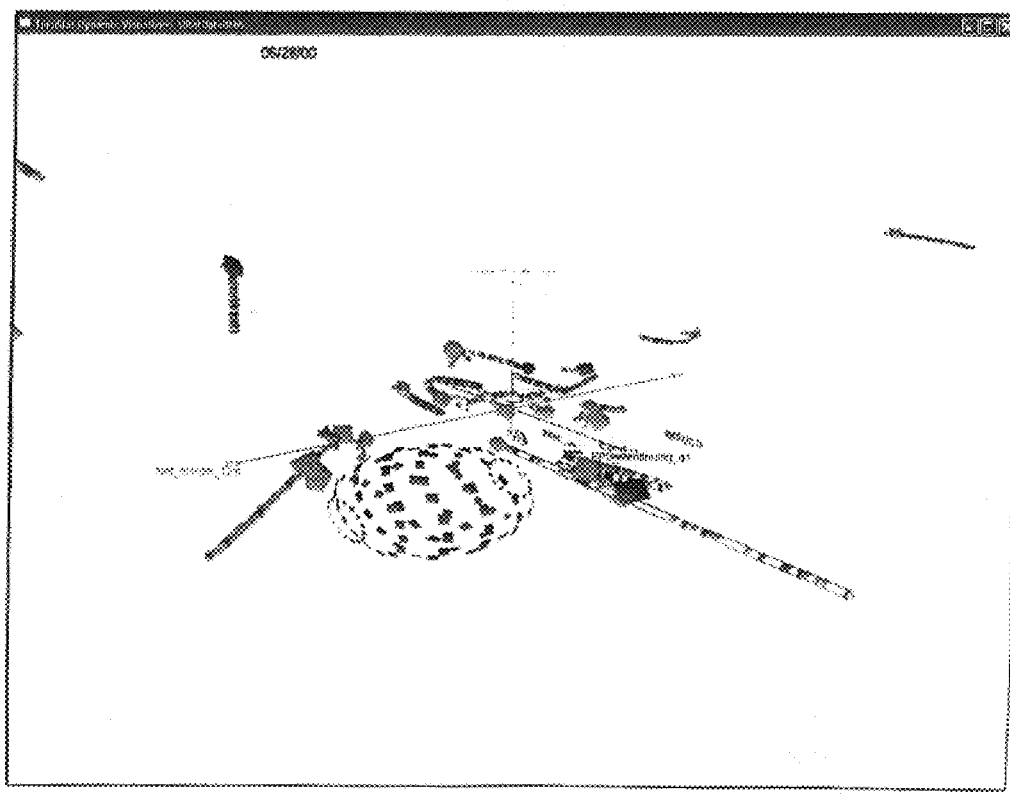
Figure 4F:
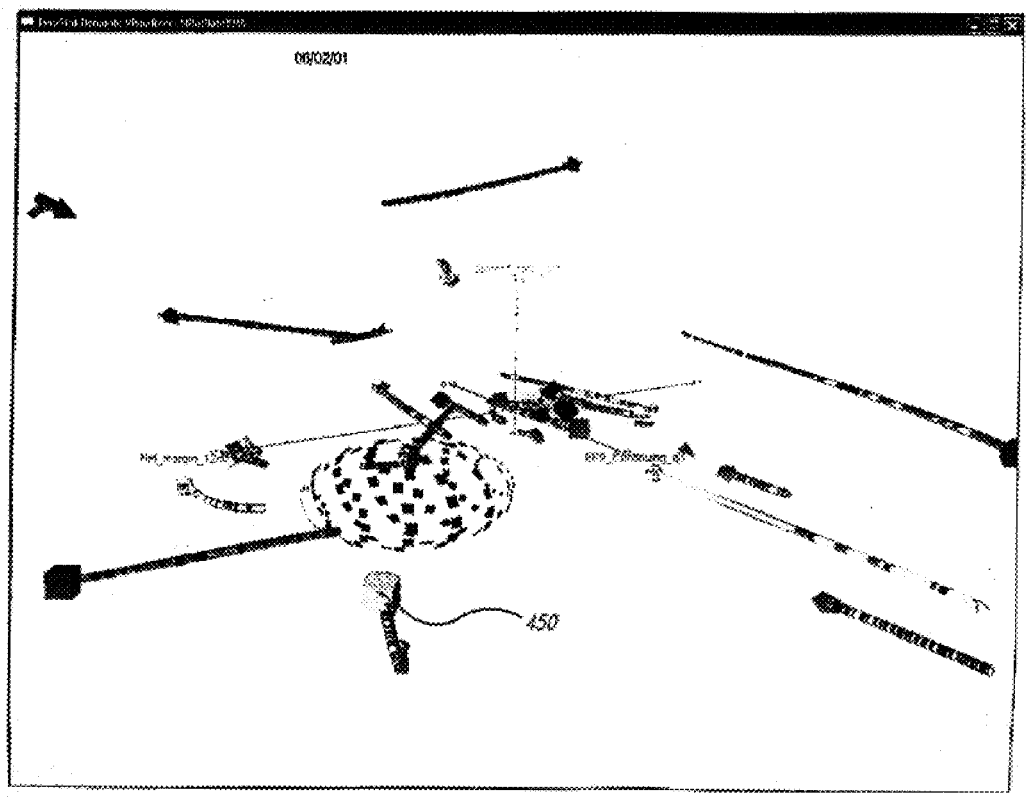
Figure 4G:
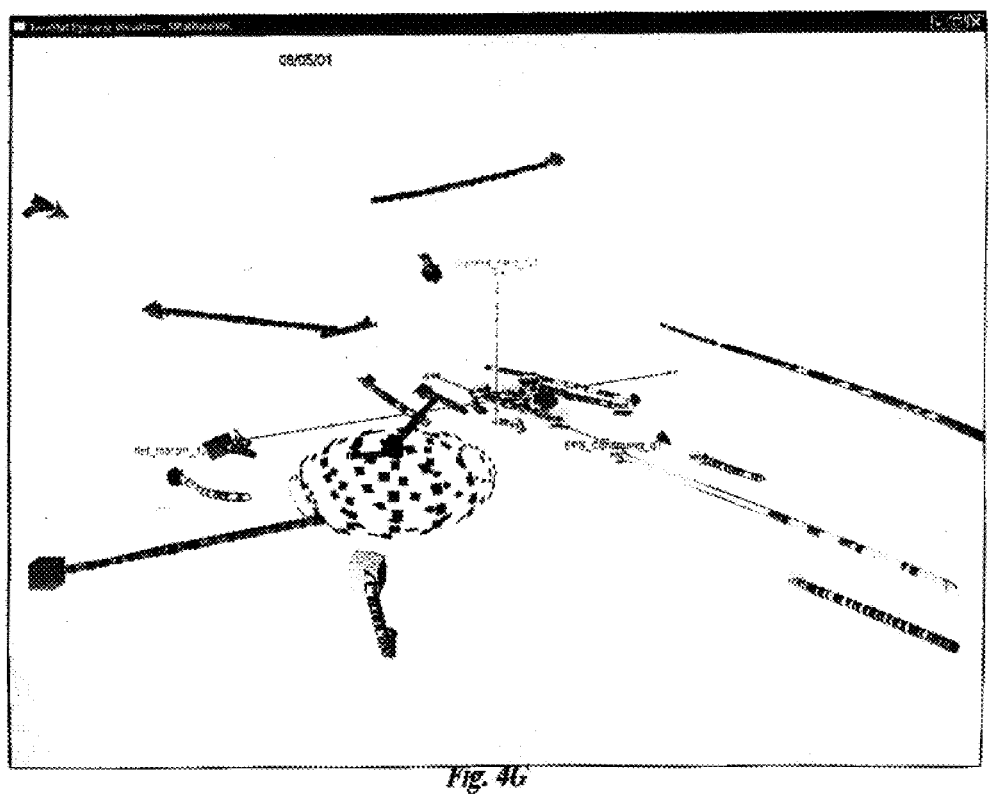
Figure 4H:
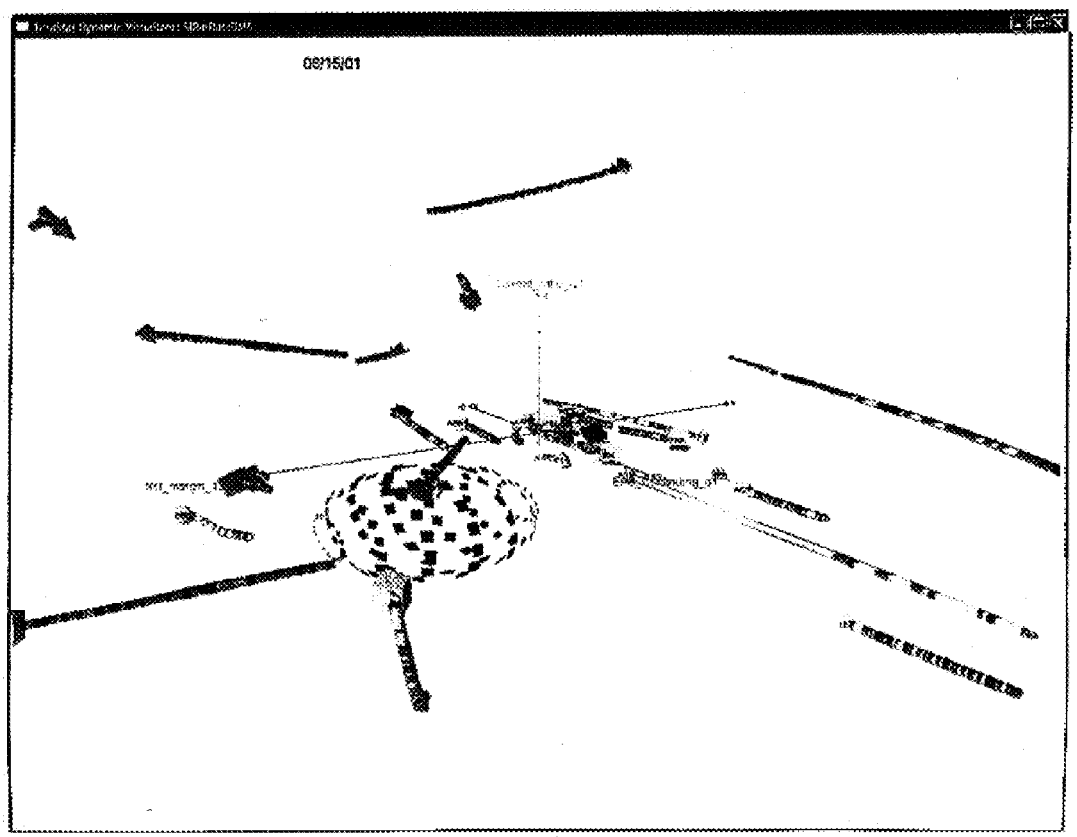
Figure 4I:
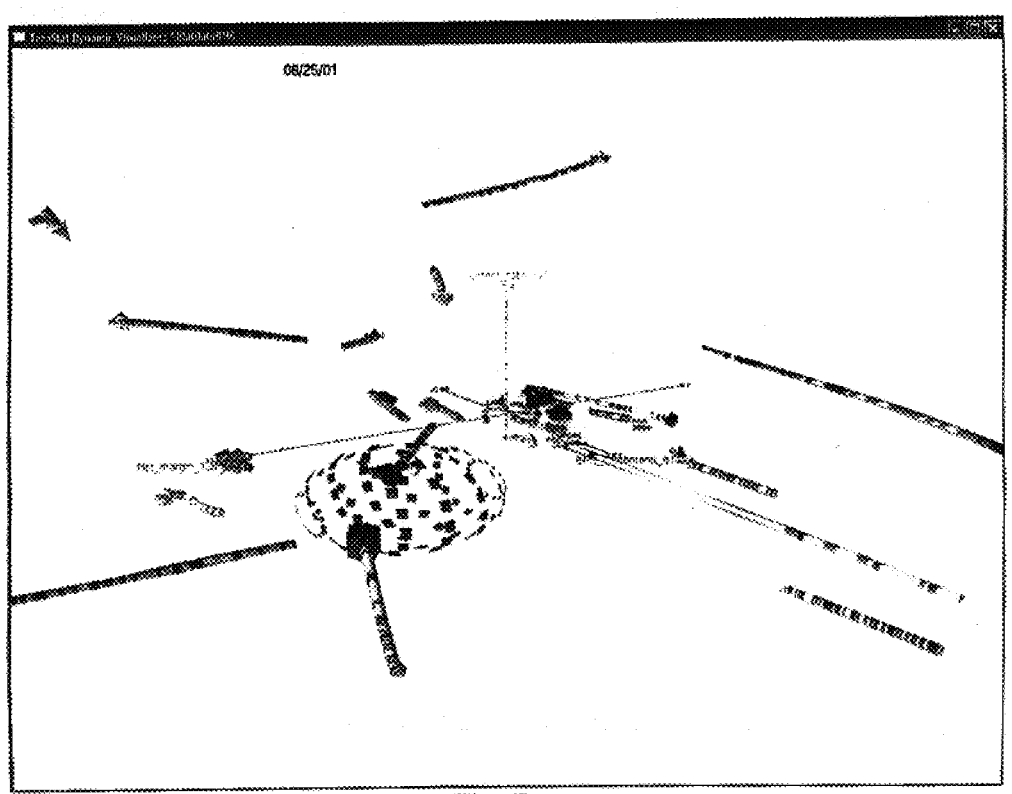
Figure 4J:
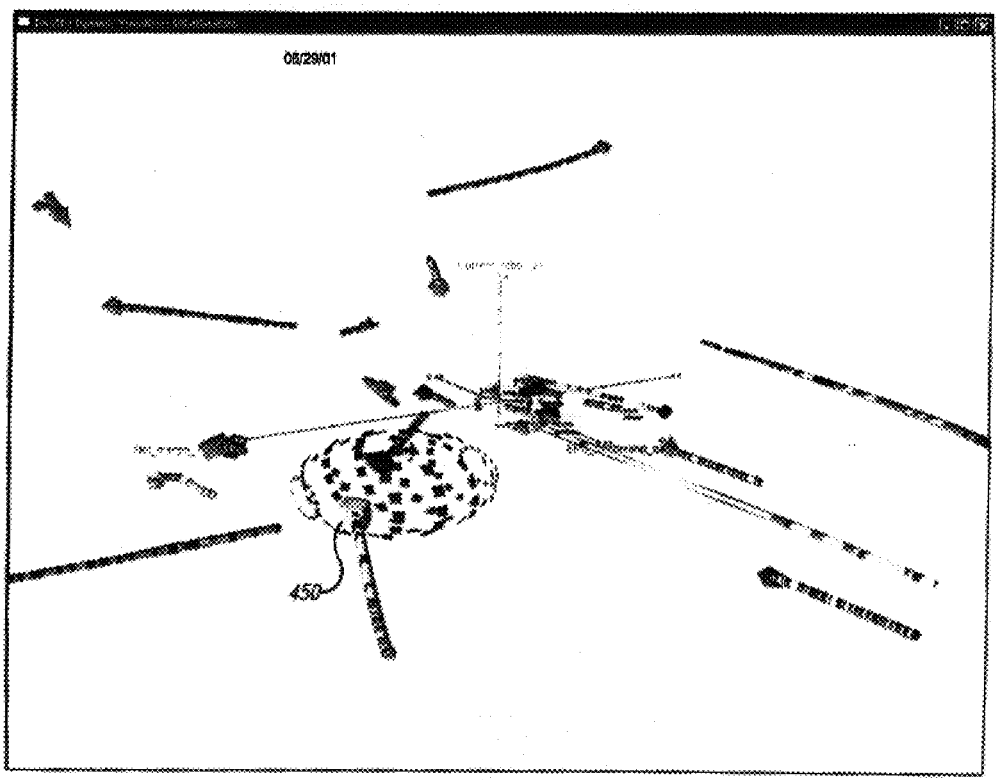

FIG. 3 is an example overview flow diagram of typical operations performed by a Dynamic Visualization System to produce multi-dimensional data visualizations. In typical operation, in step 301, a user (for example, a data analyst) invokes the attribute selection and mapping interface of the DVS to select one or more data attributes that are to be used to identify each subset of data to be displayed as a data entity (a display object); selects the data attributes of each data entity to be visualized; and indicates which attributed is to be mapped (and presented) to which visualization dimension. Once attributes are selected and mapped for presentation, then in step 302, the DVS initializes and executes a dynamic visualization engine to create data objects to correspond to each of the data entities and to begin an animation loop. The visualization (in this example, an animation) executes automatically, determining and displaying the data attribute values of each data object in accordance with the previously specified mappings of these attributes to the visualization dimensions. In step 303, the DVS executes and initializes a (near) Real-Time Control Interface. In step 304, the Real-Time Control Interface is used to alter the presentation of the visualization dimensions, actual attribute values of a data object, define visual filters, etc. In step 305, the user observes and analyzes the data visualization, returning to step 304 to make adjustments as needed. The visualization continues until stopped by the user or otherwise exited.

In one embodiment, the DVS is provided as a server that can cause multiple instances of the Dynamic Visualization System (data interface, mapping interface and engine) to run simultaneously. This capability allows an analyst to view different attributes of the same data set simultaneously; to view overlapping, but incommensurate, data sequences simultaneously, such as those that have data collected at different resolutions; and to view different points of view of the same data simultaneously, such as by reversing which spatial dimension is shown in the forefront of the display. Alternatively, the DVS can accomplish parts or all of these same capabilities by executing multiple instances of the Dynamic Visualization Engine.

FIGS. 4A–4J present a series of example display screens of an example dynamic visualization of financial data that has been dynamically constructed and automatically presented by a Dynamic Visualization Engine. Each screen illustrates the performance of corporate financial data on a single day for a subset of companies selected from a database containing data on a multitude of companies. A sampling of days from the data visualization has been captured to illustrate how the data visualization would represent changes in the data entities over a sequence of time. One of these days was previously described with reference to FIG. 1; however the point of view of the visualization is different in FIGS. 4A–4J.

In the example illustrated, three parameters of corporate financial performance were selected for visualization. The initial hypothesis was that good fiscal performance would be reflected in the price of company stock. The parameters selected, earnings per share, current ratio, and net margin, have low correlation and were mapped to the spatial dimensions 4A01, 4A02, and 4A03 (the axes) of the display space. The two top performing companies by consistent share price increase from each of twelve economic sectors were selected as data entities. Each economic sector is represented by a different data object glyph and the company is indicated by a stock ticker symbol label associated with each glyph. The color of each data object shows percent change in daily stock price and ranges from green for the largest share price percent increase to red for the largest share price percent decrease. Thus, for example, the color of the data object 4A10 representing the company whose stock ticker symbol is "FHG" is red; while the color of the data object 4A20 representing the company whose stock ticker symbol is "MYG" is green. One can observe changes to the colors of the data objects over the sequences shown in FIGS. 4A–4J.

The sequences of quarterly fiscal performance and daily share price changes (attributes with disparate resolutions) were dynamically visualized over a five-year period. Daily values for all parameters were imputed, and the representations presented at a daily interval (e.g., sequence value indicator 4A04). Each data object is shown with a trail summarizing the imputed daily corporate performance over the previous 90 days. For example, the data object 4A30 for the company whose stock ticker symbol is "RFMG" has a history trail 4A31 summarizing its performance. Each trail color change reflects market performance of the company stock at the corresponding date. The length of the trail reflects the difference in corporate performance from one quarter to the next. Thus, the history trails of each data object convey attribute value histories for more attributes than simply a prior position of the data object in time. This feature can be observed by comparing the trails of various objects in FIGS. 4A–4J.

As the original hypothesis of corporate share prices reflecting corporate fiscal performance appeared to be unsupported, alternate hypotheses were explored by defining a visual filter to specify desired performance, for example, visual filter 4A40. Visual filter 4A40 might correspond to an existing company or to hypothetical performance of a hypothetical company. Data objects that traversed the region demarcated by visual filter 4A40 were logged for additional analysis. As can be seen in FIGS. 4F–4J, over a sequence of approximately 30 days, data object 4F50 migrates from being outside the desired range of performance to inside the desired range of performance (data object 4J50).

FIG. 5 is an example display screen of a dynamic visualization of environmental data, dynamically constructed and automatically presented by a Dynamic Visualization Engine. The display represents one frame of an animated presentation of environmental data. In many communities, the survival of native fauna often depends on environmental conditions during particular portions of the year. In the example shown in FIG. 5, environmental data was analyzed to determine when the environmental conditions in Medford, Oreg. potentially would create problems for native fauna. Dynamic visualization was used to view the joint empirical statistical distribution of temperature, humidity, wind speed, and insolation (exposure to sunlight). Meteorological data from Medford, Oreg. for a 15 year period was obtained for this analysis.

To set up the dynamic visualization, the parameters of temperature, humidity, and wind speed were mapped to the spatial dimensions (the x-axis, 504, the z-axis, 503, and the y-axis, 502) of the visualization space. Cloud cover was used as a proxy for insolation and mapped to object color: red for minimum cloud cover and green for maximum cloud cover. Each year was selected as a data entity, and display glyphs, for example glyph 505, were assigned to each year's data object. A space filling trail size was selected for glyph trails of 60 days. The dynamic visualization was then run to impute the value of each of the mapped parameters for each day of each year for the 15 year series. For each day, each glyph was presented in a position on the axes based upon the parameter values for that day of the year.

In FIG. 5, two periods are shown: winter and summer. The space filling set of glyph trails 501 in the upper portion of the figure shows the joint empirical statistical distribution of the environmental parameters during the winter for each of 15 years. This distribution is far from the region of maximum stress, identified by visual filter 520. During the summer (on day 212), the distribution of yearly parameter values transits the maximum stress region boundaries often as shown by the space filling glyphs 510 occupying much of the region defined by visual filter 530. A log of entry and exit times provides a basis for identifying the most stressful periods of the year.

Figure 6:
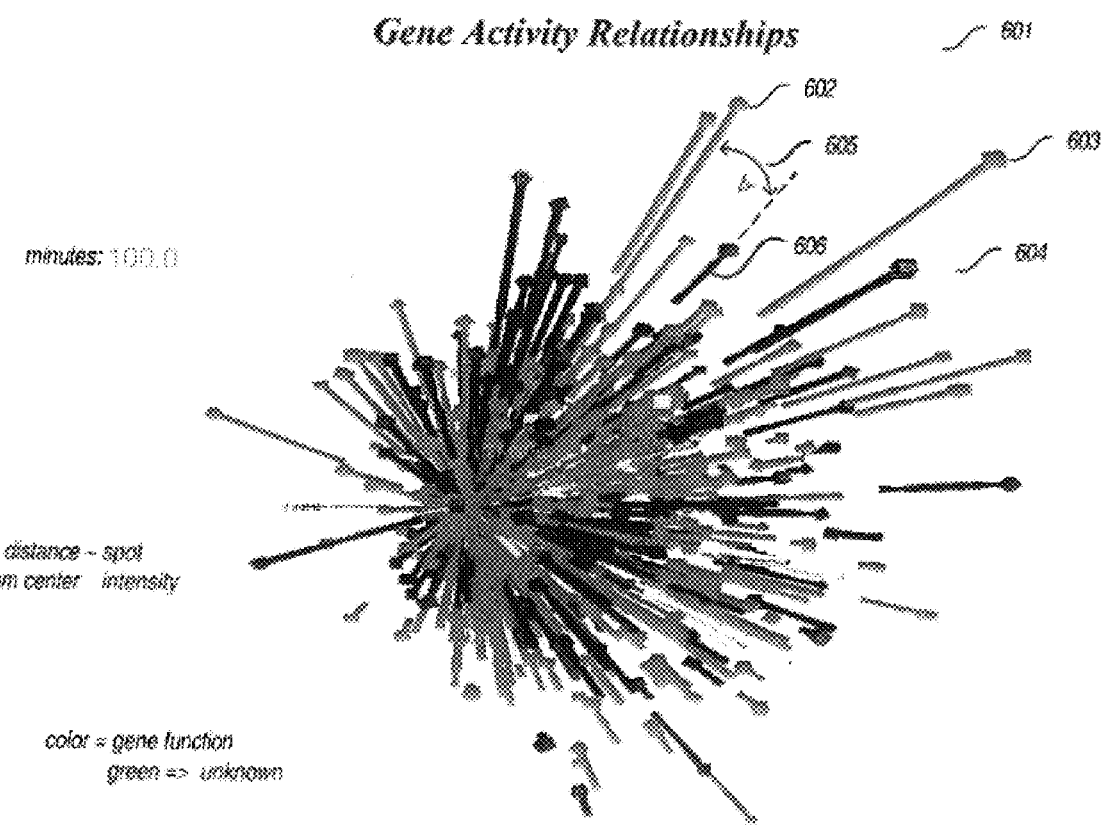
FIG. 6 is an example display screen of a dynamic visualization of gene sequence data, dynamically constructed and automatically presented by a Dynamic Visualization Engine.

FIG. 6 is an example display screen of a dynamic visualization of gene sequence data, dynamically constructed and automatically presented by a Dynamic Visualization Engine. The display screen represents one frame of an animated presentation of genomic data. The sequencing of genes in various organisms has lead to the ability to track the expression of those genes using microarrays. A microarray consists of a grid of spots, one for each gene, designed to indicate if that gene is active. Since even a simple organism, such as yeast, has thousands of genes, visualizing the relationships among gene activities is challenging.

In the example shown in FIG. 5, microarray data was analyzed to determine relationships among various genes involved in yeast reproduction. Specifically, a set of approximately 750 yeast genes known to be involved in reproduction was selected as the data to be examined. Microarrays were used to detect gene activity at 10 minute intervals over three complete cell cycles of 90 minutes each. Principal component analysis (to transform multiple attributes to an aggregate attribute) was used to identify the three largest principal components involved in reproduction, or "eigengenes." These eigengenes were then mapped to the spatial dimensions (corresponding to display coordinate axes) to define the activity space of the various genes in the data subset. Each gene was selected as a separate data entity, and display glyphs, for example, glyphs 602, 603, and 604, were assigned to the corresponding data objects. Glyph trails in the eigengene space were selected to represent the change in gene activity over a 5 minute period. The length and direction of each trail shows the rate of change of gene activity (with longer trails representing higher rates of change). Colors were assigned on the basis of the known function of each gene, e.g., green was selected to represent genes with unknown function.

The dynamic visualization was then run to impute the gene activity at one-minute intervals over the cell cycle. The principal component transformation of the microarray intensity data transformed spot intensity into distance from the origin in the eigengene space defined by the eigengene axes. Thus, greater activity is shown as a further position from the origin in eigengene space. Each gene was represented as a glyph on a vector in activity space defined by the eigengenes. The angle between two gene vectors, for example angle 605, represents the correlation of gene activity of those two genes, for example gene 602 and 606.

The near Real Time Control user interface was then used to aid in the analysis by turning on text labels for specific genes. With a large number of glyphs, glyph labels are typically turned off by default. However, knowing the identity of genes with activity of interest allows further investigation of those genes to be conducted.

The data visualization examples demonstrated in FIGS. 4A–4J, 5, and 6 are merely examples of the extent of the different kinds of analysis one can perform using the Dynamic Visualization System. One skilled in the art will recognize, however, that the techniques of DVS may be useful to create a variety of other tools, including data detection and analysis tools embedded in other devices and systems, data mining, organizational performance monitoring, or process control.

Although the techniques of dynamic data visualization and the Dynamic Visualization System are generally applicable to any type of data analysis, the phrase "data" is used generally to imply any type of object, and not just records in a data base having alphanumeric values for parameters. In addition, one skilled in the art will recognize that objects having audio or visual values can also be represented and presented by the DVS. Also, although the examples described herein often refer to a data analyst, one skilled in the art will recognize that the concepts and techniques of the present invention can also be used by other types of users. Essentially, the concepts and techniques described are applicable to any anyone with a need to present or analyze data with more attributes than can be handled simply using 3-D graphical tools.

Also, although certain terms are used primarily herein, one skilled in the art will recognize that other terms could be used interchangeably to yield equivalent embodiments and examples. For example, it is well-known that equivalent terms in the data analysis and statistics fields and in other similar fields could be substituted for such terms as "database," "tables," "modeling," "records," "attributes," "categorical data," etc. Specifically, the term "attribute" can be used interchangeably with "column," "variable," "field," etc. Likewise, the term "record" can be used interchangeably with the terms "row," "case" "observation" etc. In addition, terms may have alternate spellings which may or may not be explicitly mentioned, and one skilled in the art will recognize that all such variations of terms are intended to be included.

Example embodiments described herein provide applications, tools, data structures and other support to implement a Dynamic Visualization System to be used for the visualization of highly dimensional data for data analysis and research purposes. One skilled in the art will recognize that other embodiments of the methods and systems of the present invention may be used for other purposes, including for education, marketing, and general presentations of information. In the following description, numerous specific details are set forth, such as data formats and code sequences, etc., in order to provide a thorough understanding of the techniques of the methods and systems of the present invention. One skilled in the art will recognize, however, that the present invention also can be practiced without some of the specific details described herein, or with other specific details, such as changes with respect to the ordering of the code flow.

Figure 7:
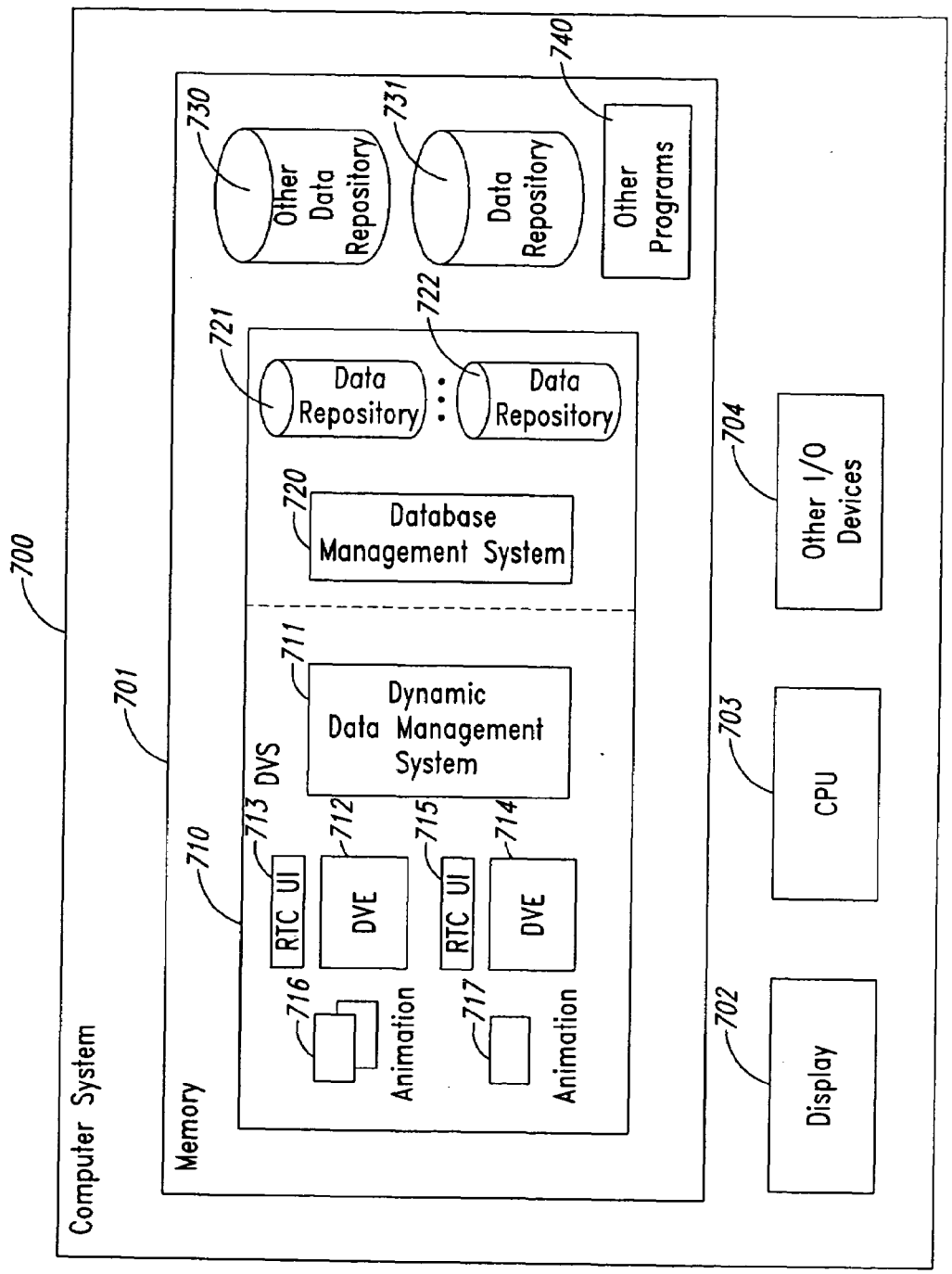
FIG. 7 is an example block diagram of a general purpose computer system for practicing embodiments of a Dynamic Visualization System.

FIG. 7 is an example block diagram of a general purpose computer system for practicing embodiments of a Dynamic Visualization System. The general purpose computer system 700 may comprise one or more server and/or client computing systems and may span distributed locations. In addition, each block shown may represent one or more such blocks as appropriate to a specific embodiment or may be combined with other blocks. Moreover, the various blocks of the Dynamic Visualization System 710 may physically reside on one or more machines, which use standard interprocess communication mechanisms to communicate with each other.

In the embodiment shown, computer system 700 comprises a computer memory ("memory") 701, a display 702, a Central Processing Unit ("CPU") 703, and Input/Output devices 704. The Dynamic Visualization System ("DVS") 710 is shown residing in memory 701. The components of the Dynamic Visualization System 710 preferably execute on CPU 703 and manage the generation and use of Dynamic Visualization Engines ("DVEs") and the Dynamic Data Management System, including the various user interfaces, as described in previous figures. In some embodiments, the Database Management System 720 and Data Repositories 721 and 722 are part of the DVS; while in other embodiments these components reside outside the DVS and potentially are distributed across other systems. Other downloaded programs 740 and potentially other data repositories, such as data repositories 730 and 731, also reside in the memory 710, and preferably execute on one or more CPU's 703. In a typical embodiment, the DVS 710 includes one or more DVEs 712 and 714 with their corresponding near Real Time Control User Interfaces 713 and 17 and controls one or more visualization (animation) presentations 716 and 717.

In an example embodiment, components of the DVS 710 are implemented using standard programming techniques. One skilled in the art will recognize that the components of the DVS that are described herein are implemented using object-oriented techniques and languages and threaded coding design so that multiple instances of the system can be run simultaneously. However, any of the DVS components 711–717 may be implemented using more monolithic programming techniques as well. In addition, programming interfaces to the Dynamic Visualization Engines and the objects created by these engines can be made available by standard means such as through C, C++, C#, and Java API and through scripting languages such as XML, or through web servers supporting such interfaces. The Database Management System 720 and data repositories 721 and 722 are preferably implemented for scalability reasons as a database system rather than as text files, however any method for storing such information may be used. In one embodiment, the DDMS, DVEs, and associated objects of the DVS are implemented using the Python language and visual Python (an interface to OpenGL graphics libraries) and communicate with the data repositories using SQL and ODBC. However, one skilled in the art will recognize that any object oriented language and environment, data repository interface and protocols, and 3-D graphics primitives and library support could be easily substituted.

One skilled in the art will also recognize that the DVS 710 may be implemented in a distributed environment that is comprised of multiple, even heterogeneous, computer systems and networks. For example, in one embodiment, the DDMS 711, the DVEs 712 and 714, the DBMS 720, and data repositories 721 and 722 are all located in physically different computer systems. In another embodiment, various components of the DVS 710 are hosted each on a separate server machine and may be remotely located from the tables which are stored in the data repositories 721 and 722. Different configurations and locations of programs and data are contemplated for use with techniques of the present invention. In example embodiments, these components may execute concurrently and asynchronously; thus the components may communicate using well-known message passing techniques. One skilled in the art will recognize that equivalent synchronous embodiments are also supported by an DVS implementation. Also, other steps could be implemented for each routine, and in different orders, and in different routines, yet still achieve the functions of the DVS.

Figure 8:
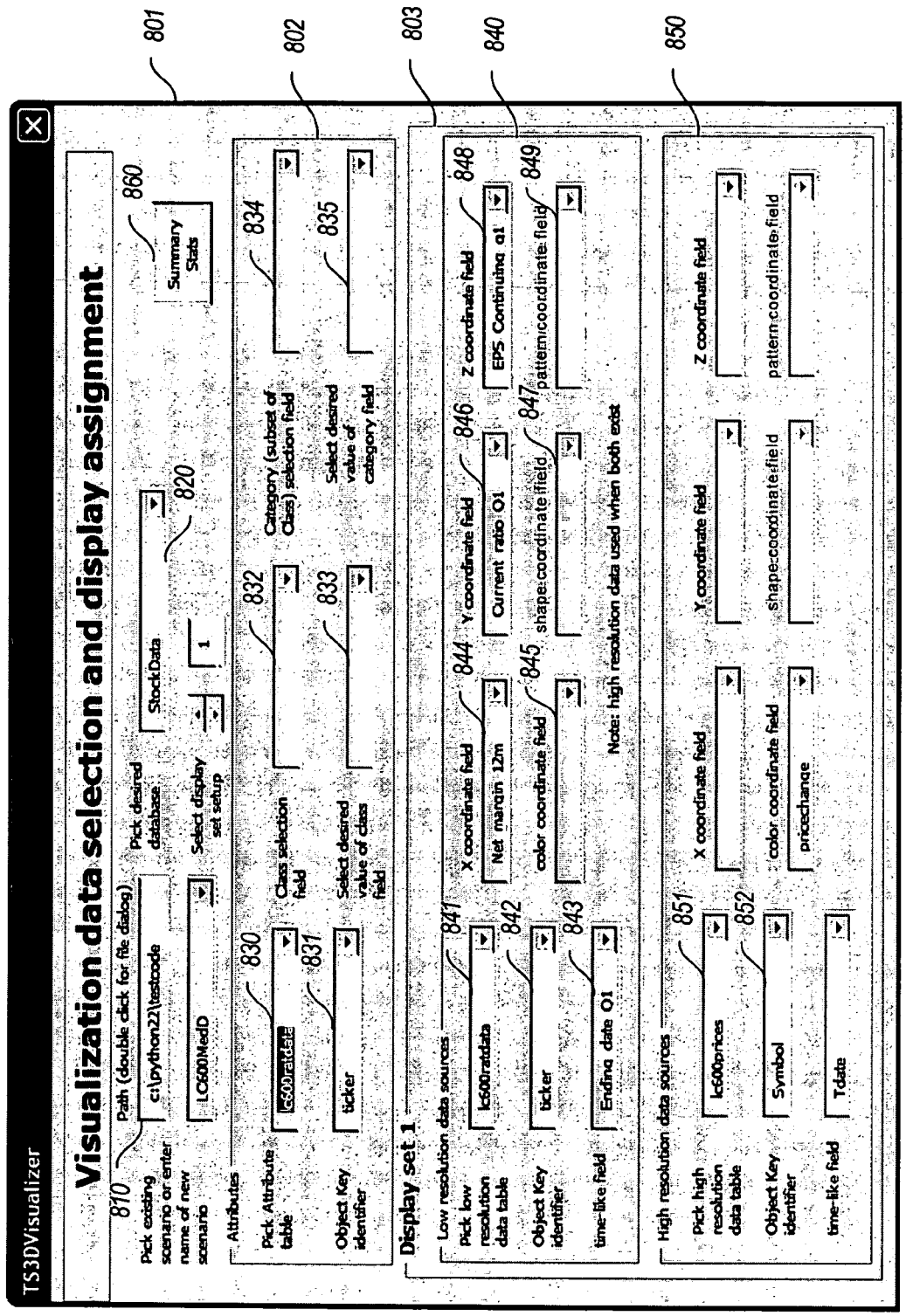
FIG. 8 is an example display screen of a user interface component of a Dynamic Data Management System of an example Dynamic Visualization System for selecting and mapping data attributes.

As described in FIGS. 1–6, one of the functions of the Dynamic Data Management System of a Dynamic Visualization System is to set up data scenarios for dynamic data visualizations. FIG. 8 is an example display screen of a user interface component of a Dynamic Data Management System of an example Dynamic Visualization System for selecting and mapping data attributes. In the example user interface shown in FIG. 8, the user fills out a dialog 801 (e.g., a form) to identify and select attributes for dynamic data visualization. In one embodiment, dialog 801 is preferably completed from top to bottom, left to right order, however some fields are optional.

Each data visualization is associated with a corresponding scenario, which defines the data attributes and maps them to visualization dimensions. Thus, a user first identifies an existing scenario for modification or specifies the location and name of a new scenario in scenario field 810. Next, in database selection field 820, the user selects a database that contains the tables of data to be visualized.

Section 802 contains input fields 830–835 for specifying which portions of the data are to be visualized as data entities. In attribute table field 830, the user indicates the name of a table that contains the attributes that define the subset of data that is to be visualized. From this table, the user selects an object key identifier attribute 831. Each unique value of this categorical attribute is used to identify a subset of data (a data entity) to associate with a data object for presentation purposes. The user can further refine the subset of data to be presented by selecting a class field (attribute) 832 of the attribute table specified in attribute table field 830 to identify different classes of objects. Specific values of the class attribute may be selected for presentation in field 833. Category attributes and their specific values may be specified in fields 834 and 835, respectively, to further refine the selection. Note that only the table and object key fields are necessary to subset the data for visualization. The other fields are optional and can be implemented using standard database query mechanisms.

One example of the use of data sub-setting is shown in FIG. 1. Company stock ticker symbols correspond to key identifiers, economic sectors correspond to a class attribute, and one particular sector (e.g., manufacturing) corresponds to its value. These entities may be further subset as categories of economic sectors (e.g., manufacturing) with one type (e.g., cabinetry) as a particular category.

Once the user has identified attributes to use as selectors of data entities, the user can assign the other attributes to display coordinates (dimensions). In the example dialog 801 section 803, the user can assign attributes for both high-resolution and low-resolution data if separate tables are available in the data repository. ("Resolution" as used here typically refers to the granularity of the information contained in a table, for example "daily" versus "weekly summary" data.) For example, in section 803, a table containing high-resolution data 851 and corresponding attribute mappings can be specified in mapping area 850, while a table containing low-resolution data 841 and corresponding attribute mappings can be specified in mapping area 840. For example, when working with corporate financial data, a user may wish to observe a data visualization for both quarterly financial values (low-resolution data) and daily stock prices (high-resolution data).

The object key identifier fields 842 and 852 are used to maintain links among selected tables. Therefore, the contents of these fields are preferably nearly identical. It is thus also possible for all three tables, the attributes table used to define data entities (specified in field 830); the low-resolution table (specified in field 841); and the high-resolution table (specified in field 851) to refer to the same table in a data repository.

Since the high and low resolution tables are mapped similarly, only the low resolution table set up is discussed in more detail. The remaining input fields 843–849 specify the mappings between data attributes and the visualization dimensions. Specifically, the sequence selection field, time-like field 843, maps an attribute to a sequence dimension. Its contents specify an attribute that will be used by the Dynamic Visualization Engine to provide sequential values for displaying sequences of data values in each category of data entity. These sequences are often time intervals. The user specifies other data attributes in the coordinate fields 844, 846, and 848 to map these attributes to the spatial dimensions that correspond to x, y, and z coordinates in the display (presentation) space. The user may also assign other attributes to the appearance dimensions by specifying attribute identifiers in color coordinate field 845, shape coordinate field 847, and pattern coordinate field 849. These appearance coordinates determine the appearance of the glyph that is used to represent a data entity. Note that in some embodiments, glyphs (e.g., display icons) specific to the data set (visual analogs), or data imported from other sources can be used. For example, a glyph for an airline might be an airplane icon and a glyph for an automotive company might be an automobile icon.

A user can specify similar mappings using data from the high-resolution table 851 as well. If selected attributes are mapped to a dimension from both high and low resolution tables, one convention is that the high-resolution data takes precedence. Note that other conventions are also possible.

Once attributes have been mapped to the visualization dimensions, then the user can select the "Summary Stats" button 860 to signal the Dynamic Data Management System to calculate summary data for review by the user and to save the scenario specifics in a Scenario Attribute Description file. FIG. 9 is a list of example attribute definitions specified in an example Scenario Attribute Description file. Attribute definitions 901 correspond to the fields set using the Attribute Selection and Mapping User Interface described with reference to FIG. 8. An example explanation of each attribute 902 is provided for convenience.

In one example embodiment, the contents of the Scenario Attribute Description file are also displayed in a user-friendly worksheet, such as a spreadsheet. FIG. 10 is an example worksheet summary data file (spreadsheet) produced by a Dynamic Data Management System of an example Dynamic Visualization System to summarize attribute mappings. The worksheet summary data file 1001 indicates the database selected in cell 1002 and the tables within the database to be used as the attribute table 1010, the low-resolution data 1011, and the high-resolution data table 1012. The Scenario Attribute Description file (hence the worksheet summary) also provides a mapping of each data attribute to its corresponding dimension (display attribute). A summary distribution 1020 shows the minimum, 10%, 25%, 50%, 75%, 90%, and maximum values for each mapped attribute. The Dynamic Visualization Engine uses these values to scale the dimensions of the display coordinate system. The scaling factors for the display of the selected data attributes are shown in cells 1040. These can be changed using the summary data worksheet as well as using the near Real-Time Control User Interface as described below with reference to FIG. 11. Similarly, the default DVE presentation window size shown in field 1003 can be changed. Although the presentation window size is modifiable, in one embodiment these values also indicate the capture region for recording a dynamic visualization. Thus, changing the presentation window size could adversely effect a recording.

Information area 1030 shows additional information about the selected data attributes. In one embodiment, the worksheet 1001 displays the number of records found and the maximum and minimum sequence values. These values provide a check on the data sub-set selected. If the number of objects or records is too large or unexpectedly different from expectations, changes can be made to the scenario before displaying it.

When the user has completed the attribute mappings and is satisfied with the overview of the data set selected, the user selects the display visualization button 1060 to instantiate a Dynamic Visualization Engine, passing it an indicator to the Scenario Attribute Description file. In one embodiment, the DVS also launches a near Real-time Control User Interface to allow the user to interactively affect the dynamic visualization displayed using the instantiated DVE.

Figure 11:
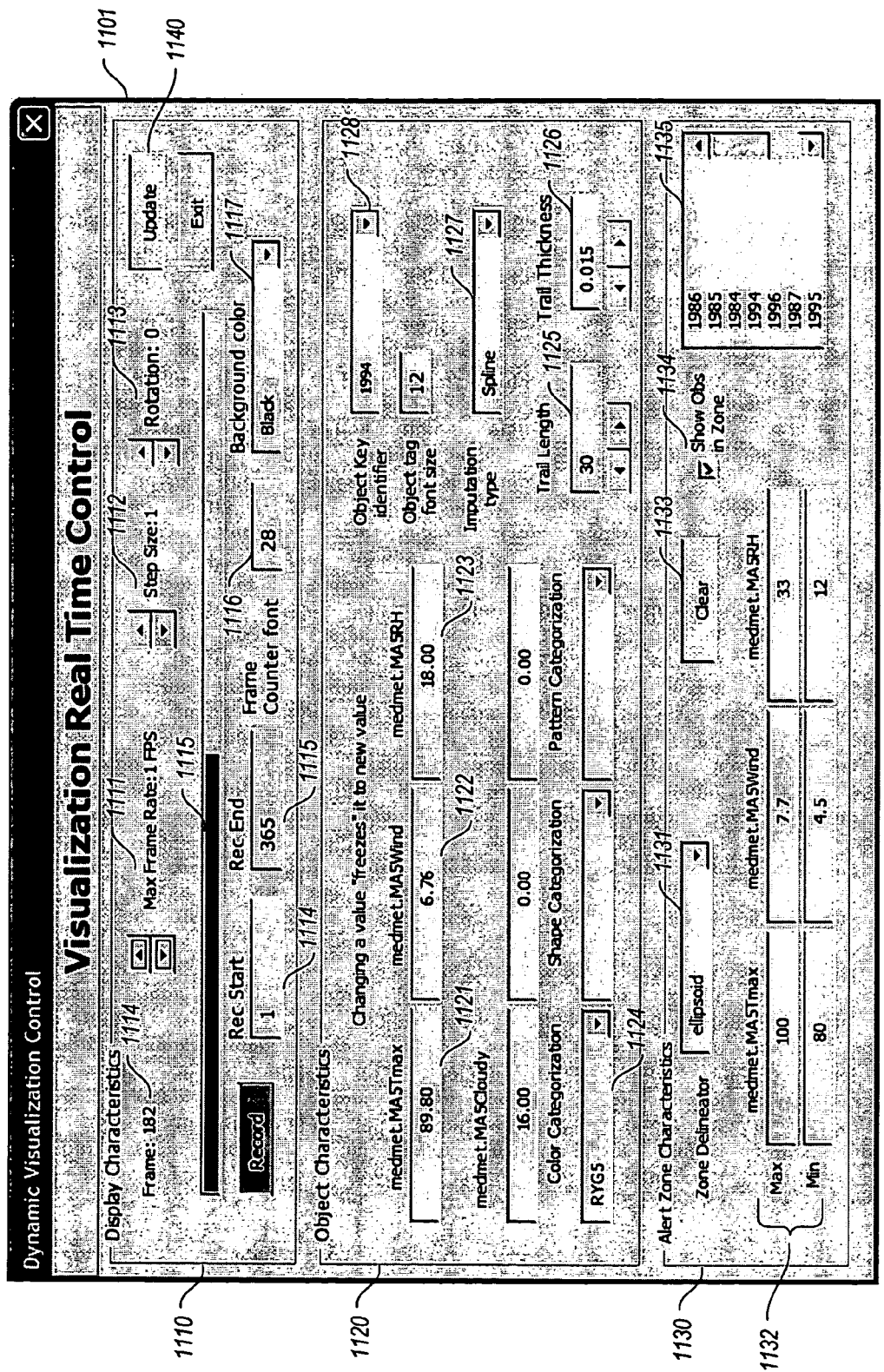
FIG. 11 is an example display screen of a near Real-Time Control User Interface for changing display and object parameters while a data visualization is being presented.

FIG. 11 is an example display screen of a near Real-Time Control User Interface for changing display and object parameters while a data visualization is being presented. The near Real-Time Control User Interface ("RTC") 1101 is a dialog window, form, or equivalent, used to interactively influence a currently executing presentation. For each DVE instance that is launched by the DVS, there is typically a corresponding RTC launched for controlling parameters in that particular instance.

In the embodiment demonstrated in FIG. 11, region 1110 controls display characteristics; region 1120 controls object characteristics; and region 1130 defines and controls a visual filter. One skilled in the art will recognize that the RTC can be easily expanded to control additional features of the dynamic visualization, including the possibility of defining multiple visual filters for one visualization. In addition, the RTC can be appropriately modified to control other types of visualizations such as audio presentations or other presentations not on a display screen.

Specifically, in the example RTC 1101 shown, a user can determine the maximum frame rate 1111, the presentation (frame) step rate 1112, and amount of view point rotation (spin) 1113. The current frame being displayed is indicated in counter 1114 and its position relative to the entire sequence is shown in progress bar 1115. Characteristics such as the background color 1117 and the font for the frame counter 1116 can also be controlled. In addition, the RTC supports a "recording" facility for recording a dynamic visualization.

A user can also control various characteristics of a particular object through the interfaces provided in region 1120. Specifically, actual attribute values for an object identified by the Object Key Identifier dropdown 1128 that are mapped to the visualization dimensions can be modified using input fields 1121–1124. In addition, the characteristics of the history trail for the object 1125 and 1126 and the imputation function type 1127 can be explicitly set or modified. This allows the user to interactively tailor the visualization while it is ongoing.

The fields of region 1130 are used to define or modify a visual filter. A user defines a visual filter type 1131, the method of demarcation 1133, a corresponding series of constants used to define a convex shape 1132 (or analogous constraints for other types of visual filters), and indications of which data objects are of interest in fields 1134 and 1135.

When the updates have been completed, the user presses the Update button 1140 to cause them to be forwarded to the running DVE to take effect.

Figure 12:
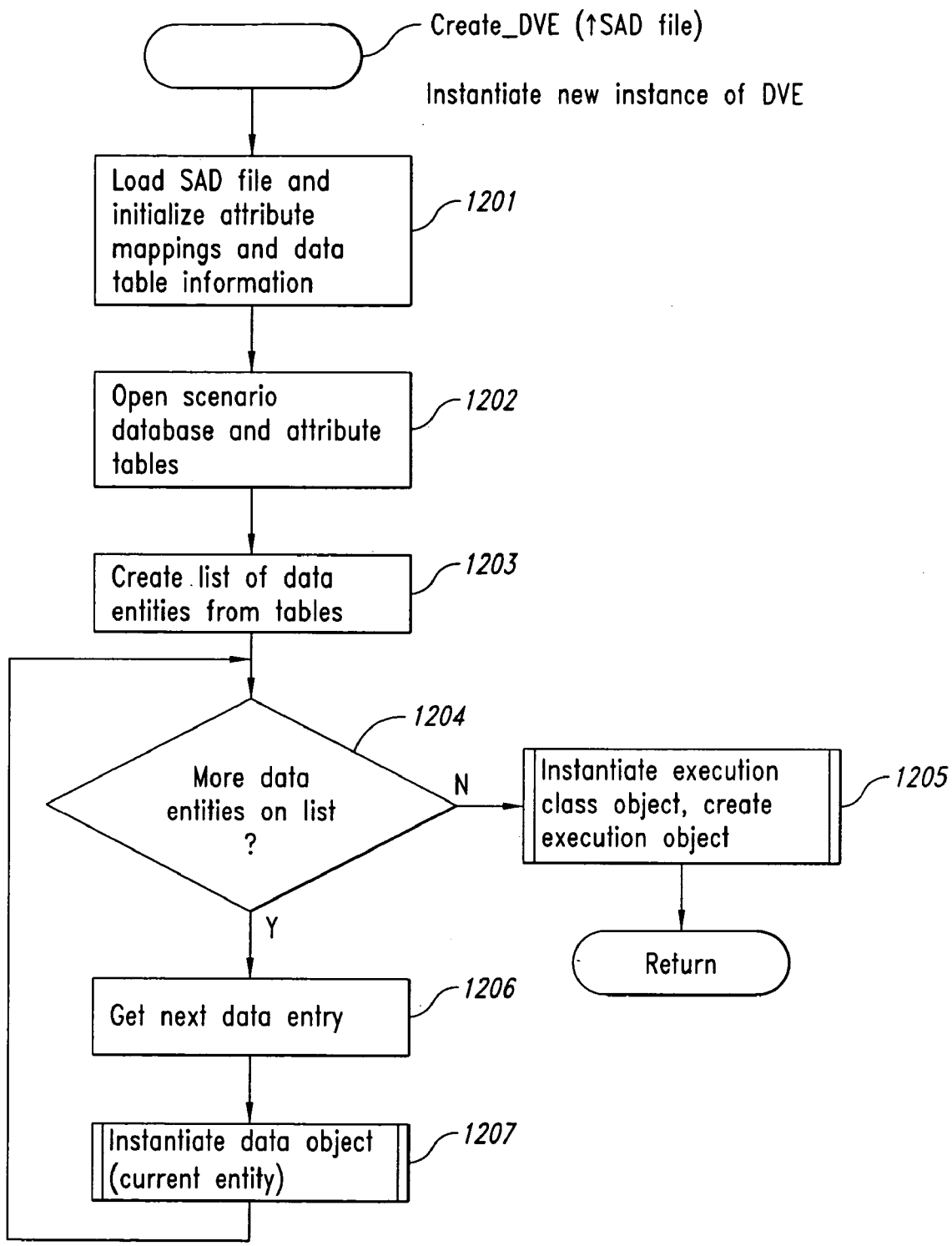
FIG. 12 is an example flow diagram of a creation routine for instantiating an instance of a Dynamic Visualization Engine.

FIG. 12 is an example flow diagram of a creation routine for instantiating an instance of a Dynamic Visualization Engine. This routine is called by the DDMS after setting up a data visualization scenario to actually run the visualization. In step 1201, the DVE loads the definitions contained in the designated Scenario Attribute Description ("SAD") file and initializes the attribute mappings to the visualization dimensions contained therein. These mappings and definitions are shared as needed with the objects instantiated by the DVE instance. In step 1202, the routine opens the database and accesses the data tables indicated by the loaded definitions. At this point, all of the unique data entity identifiers are recovered from the database tables and a list of data entities is created in step 1203. In steps 1204–1207, this list is used to create data objects for each data entity. Specifically, in step 1204, if there are more entities to process, then the routine continues in step 1206, else continues in step 1205. In step 1206, the routine obtains an indication of the next data entity to process. In step 1207, the routine instantiates a data object to correspond to the current data entity resulting in execution of the data object's creation routine, which is described further with respect to FIG. 13, and returns to the beginning of the loop in step 1204. In step 1205, once all of the data objects are created, the DVE instantiates an instance of an execution class object, which is used to create execution object instances, each as a thread controlled by the execution class object. The routine then returns.

Table 1 is an example set of attributes defined for a data object. One skilled in the art will recognize that other or different attributes are possible. As can be seen the data object instance is used to tie together several other instantiations as well as store values of some important attributes.

TABLE 1

Data Object Attributes

| ATTRIBUTE | DESCRIPTION |
| --- | --- |
| ObjImpute | impute class instantiation |
| Parent | pointer to parent |
| tag | label class instantiation |
| tagtext | text for object label |
| tagfontsize | object label font size |
| showtag | boolean |
| url | link |
| trail_len | length of object trail as fraction of total |
| trail_thick | object trail thickness |
| shape | name of object shape |
| size | size of object |
| pattern | pattern of object |
| color | color of object |
| colorscheme | color scheme for discrete color mapping |
| shapescheme | shape scheme for discrete shape mapping |
| patternscheme | pattern scheme for discrete pattern mapping |
| obj | instantiation of graphic display object |
| trail | instantiation of graphic line class |
| pos | tuple of scaled object 3 spatial position |
| posval | tuple of native object 3 spatial values |
| cspval | tuple of native color, shape, and pattern values |
| XYZCSPfreeze | six element flag indicating if parameter update is frozen or can be set using RTC |

Figure 13:
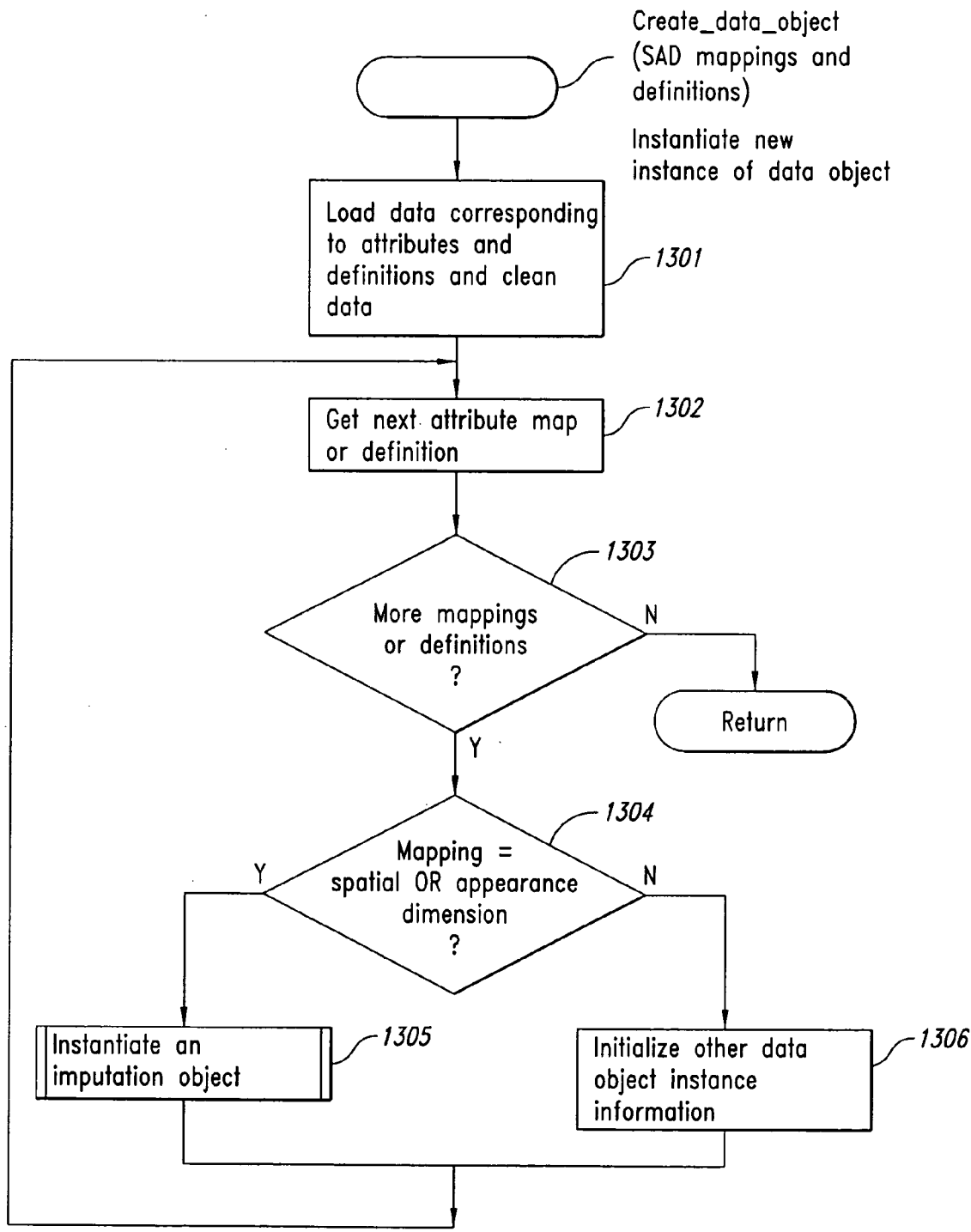
FIG. 13 is an example flow diagram of a creation routine for instantiating an instance of a data object.

FIG. 13 is an example flow diagram of a creation routine for instantiating an instance of a data object. This routine is called each time a data object is instantiated by a DVE to correspond to a data entity. The definitions from the SAD file are available to this routine through the data loaded into state variables of the DVE object. Specifically, in step 1301, the routine initialize variables and loads data from the data repository that corresponds to each attribute-to-visualization dimension mapping. In one embodiment, the routine cleans the data by removing all records for which no data exists and records for duplicate sequence values. In steps 1302–1306, the routine determines which attributes require imputation objects, and instantiates one for each data object state variable (attributes that are mapped to spatial and appearance dimension). In step 1302, the routine obtains the next attribute mapping or definition and in step 1303, if there is still one to process, the routine continues in step 1304, else returns. In step 1304, the routine determines if the attribute is mapped to a spatial or appearance dimension, thereby indicating that an imputation object is desired. If so, the routines continues in step 1305 to instantiate an imputation object, otherwise continues in step 06 to initialize other data object instance information. The routine then returns to the beginning of the loop in step 1302 to process the next attribute.

Figure 14:
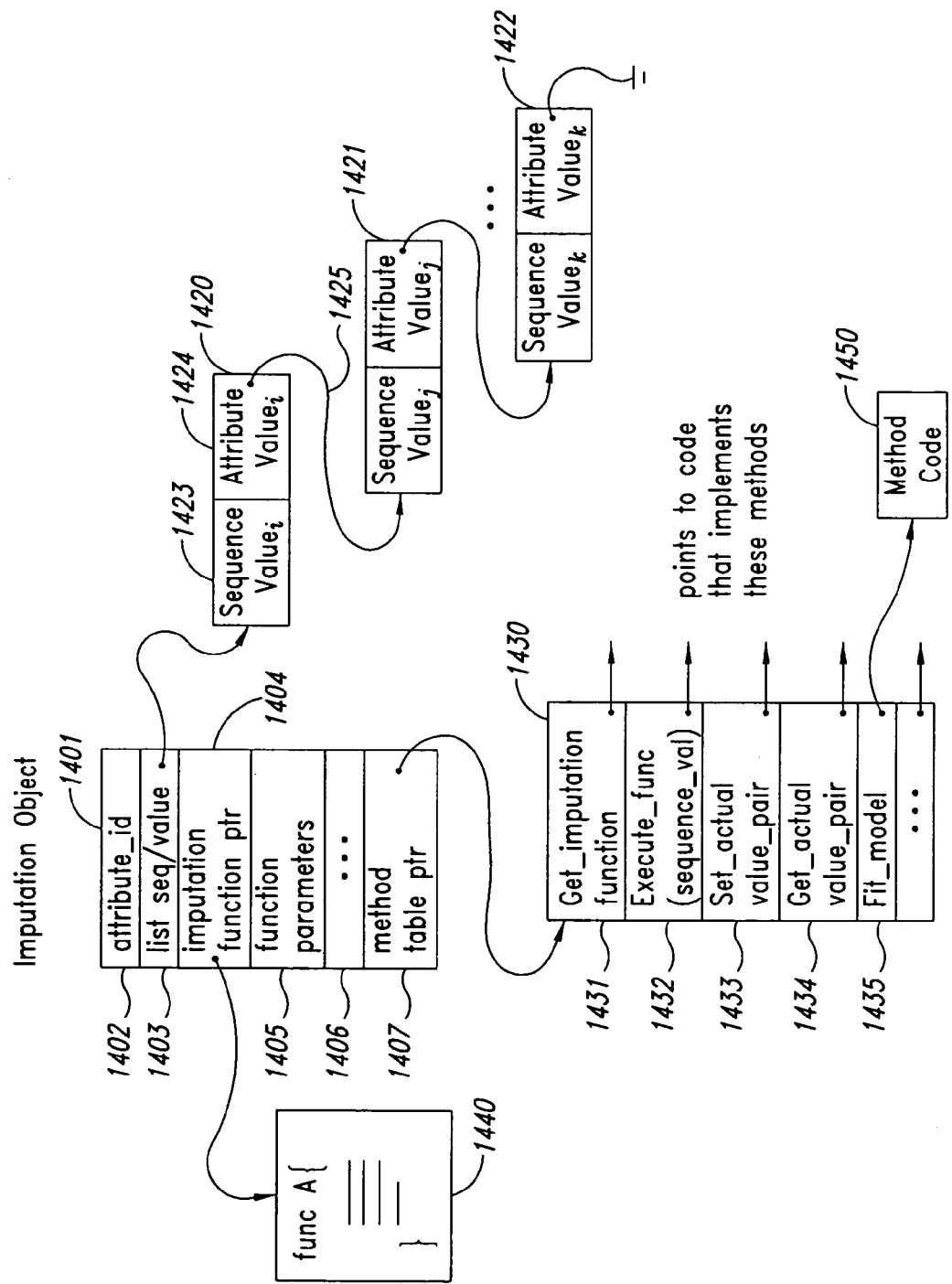
FIG. 14 is an example block diagram of an imputation object after instantiation.

FIG. 14 is an example block diagram of an imputation object after instantiation. Upon instantiation, each imputation object pre-calculates and stores all needed parameters for the stored imputation function or model and stores the actual sequence, value pairs. In general, each imputation object contains sufficient information to allow an imputation function/model to be computed to assign a value to an attribute for each value of a sequential variable. This assignment may range from a univariate function of data entity data, a multivariate function of data from a plurality of data entities, or a function preserving statistical characteristics of data entity data. For example, simple linear interpolations, cubic splines, and more complex statistical functions such as ARIMA (auto regressive integrated moving average) models may be incorporated as imputation functions.

Models that require fitted parameters calculate the best fit to the existing (actual) data attribute values during instantiation of the imputation object. Several models may be fit during instantiation, allowing the user to switch among imputation models during dynamic visualization. Pre-calculating and storing parameter values for the imputation model allows fast dynamic imputation of an imputed value for a particular sequence value.

As shown in FIG. 14, imputation object 1401 contains an attribute identifier 1402; a list of sequence, attribute value pairs 1403; a pointer or other indicator 1404 to an imputation function or model 1440; function fitting parameters 1405, if appropriate; a pointer 1407 to a table of methods 1430 that implement the imputation object; and other variables 1406. The list of sequence, attribute value pairs 1403 contains an entry 1420–1422 for each actual data attribute value for each sequence value defined in the underlying data. This enables an imputation object, when presented with a sequence value, to return an actual value if the sequence value was defined in the underlying data and to determine an imputed value for all other sequence values. For example, entry 1420 contains a sequence value 1423, its corresponding attribute value 1424, and a pointer to the next pair 1425. The method table 1430 for an imputation object typically contains methods for retrieving the imputation function 1431; executing the function 1432 setting a sequence, attribute value pair 1433; retrieving a sequence, attribute value pair 1434, fitting the model 1435, etc. Each method table entry contains an indicator to the method code 1450 used to implement the method.

Figure 15:
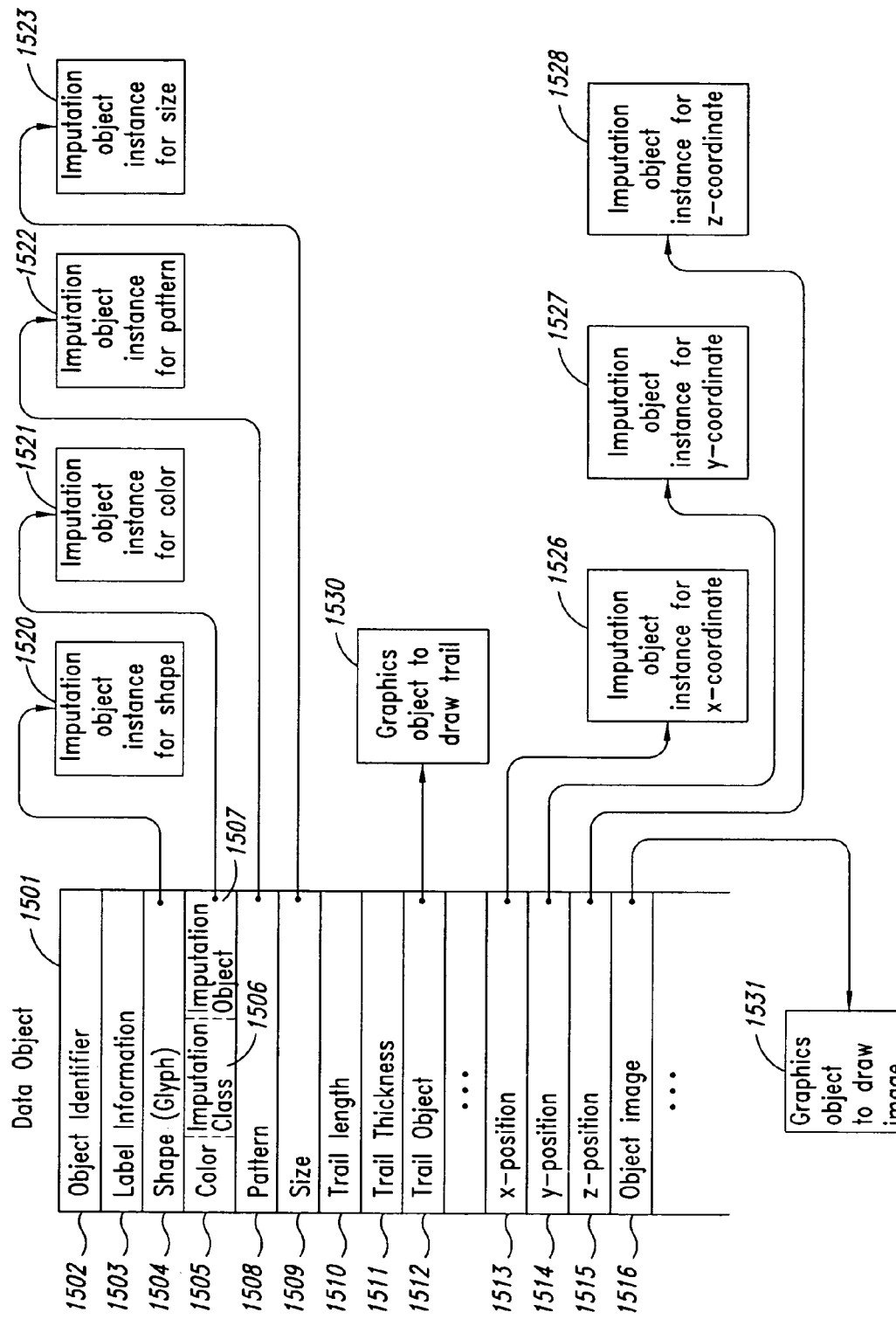
FIG. 15 is an example block diagram of a data object after instantiation.

FIG. 15 is an example block diagram of a data object after instantiation. Thus, the data object 1501 contains pointers to all of the other associated instantiated objects, such as the imputation objects created in step 1305 of FIG. 13. The data object 1501 is merely an example—one skilled in the art will recognize that other state variables may be implemented. For example, there are additional attributes shown in Table 1 that are not illustrated here. In the example shown, data object 1501 implements an object identifier 1502; label information 1503; a pointer (or other indicator) to an imputation object for dynamically determining the attribute value of the attribute mapped to the shape appearance dimension 1504; a pointer to an imputation object for dynamically determining the attribute value of the attribute mapped to the color appearance dimension 1505; a pointer to an imputation object for dynamically determining the attribute value of the attribute mapped to the pattern appearance dimension 1508; and a pointer to an imputation object for dynamically determining the attribute value of the attribute mapped to the size appearance dimension 1509. Note that each of these state variables that indicates an imputation object typically contains an indicator of the imputation class 1506 and a pointer to the object 1507. This allows different imputation objects to be instantiated for each attribute and modified on-the-fly. Data object 1501 also implements a trail length indication 1510, a trail thickness indication 1511, and a pointer to a graphics object that implements the trail 1530. Data object 1501 also contains state information that corresponds to the spatial dimensions including a pointer to an imputation object for dynamically determining the attribute value of the attribute mapped to the x-coordinate spatial dimension 1513; a pointer to an imputation object for dynamically determining the attribute value of the attribute mapped to the y-coordinate spatial dimension 1514; and a pointer to an imputation object for dynamically determining the attribute value of the attribute mapped to the z-coordinate spatial dimension 1515. A pointer 1516 to a graphics object used to draw the object glyph is also stored.

After all data objects are instantiated and associated data loaded, the DVE instantiates an execution class object (for example, in step 1205 in FIG. 12). This execution class object is then used to instantiate each separate execution thread. The class attributes of this class are used to coordinate multiple synchronous dynamic visualizations. The first instance of this class updates the execution class object's current sequence value, and subsequent instances of this class use the current sequence value of the execution class object.

Figure 16:
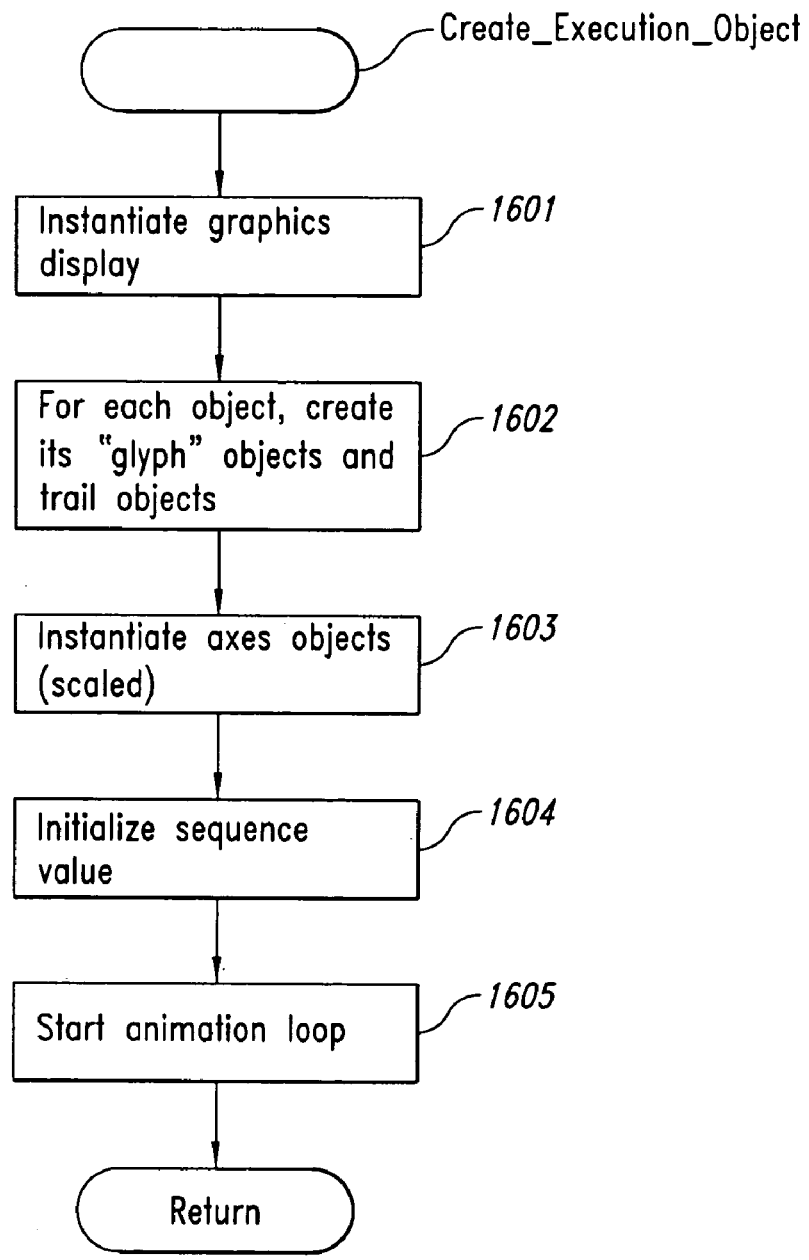
FIG. 16 is an example flow diagram of a creation routine for instantiating an instance of an execution object for portraying a data visualization.

FIG. 16 is an example flow diagram of a creation routine for instantiating an instance of an execution object for portraying a data visualization. In step 1601, the routine instantiates a graphics display object for presenting the data visualization. The graphics display object is instantiated using attribute values passed in the SAD file and other default values. The display characteristics may be altered dynamically by changing the display parameters, using, for example the near Real-Time Control User Interface described with reference to FIG. 11. Depending upon the underlying graphics subsystem, this step may be accomplished using a variety of well-known techniques. One embodiment of the graphics display object uses Vpython as a graphics display engine. This module is a high level wrapper for OPENGL. Other implementations of the Dynamic Visualization System may use OPENGL, or any other graphics primitives, directly. The Vpython graphics engine incorporates many of the methods such as spinning and zooming, commonly associated with 3-D graphics displays.

In step 1202, for each data object, the routine associates a glyph (graphics object) and a trail graphics object to draw the object and its trail on the graphics display. The position and color of each graphics object is based on the values of the data attributes that were mapped to these visualization dimensions. One skilled in the art will of course recognize that analogous steps are performed when the presentation is audio instead of graphical.

In step 1603, the routine instantiates graphics objects for each axis scaled as appropriate. The scaling of the data object values is calculated to fit most data values into a standard size graphics display. The axes provide spatial orientation as to the attribute values being displayed. Axes are created to cover approximately 80% of the value ranges of the data object values using the distribution of values observed in each data object.

In step 1604, the routine initializes the sequence dimension value. In step 1605, the routine generates an "animation" or other presentation process thread, and then returns. This thread contains the dynamic visualization loop (also referred to as a "animation loop").

Figure 17:
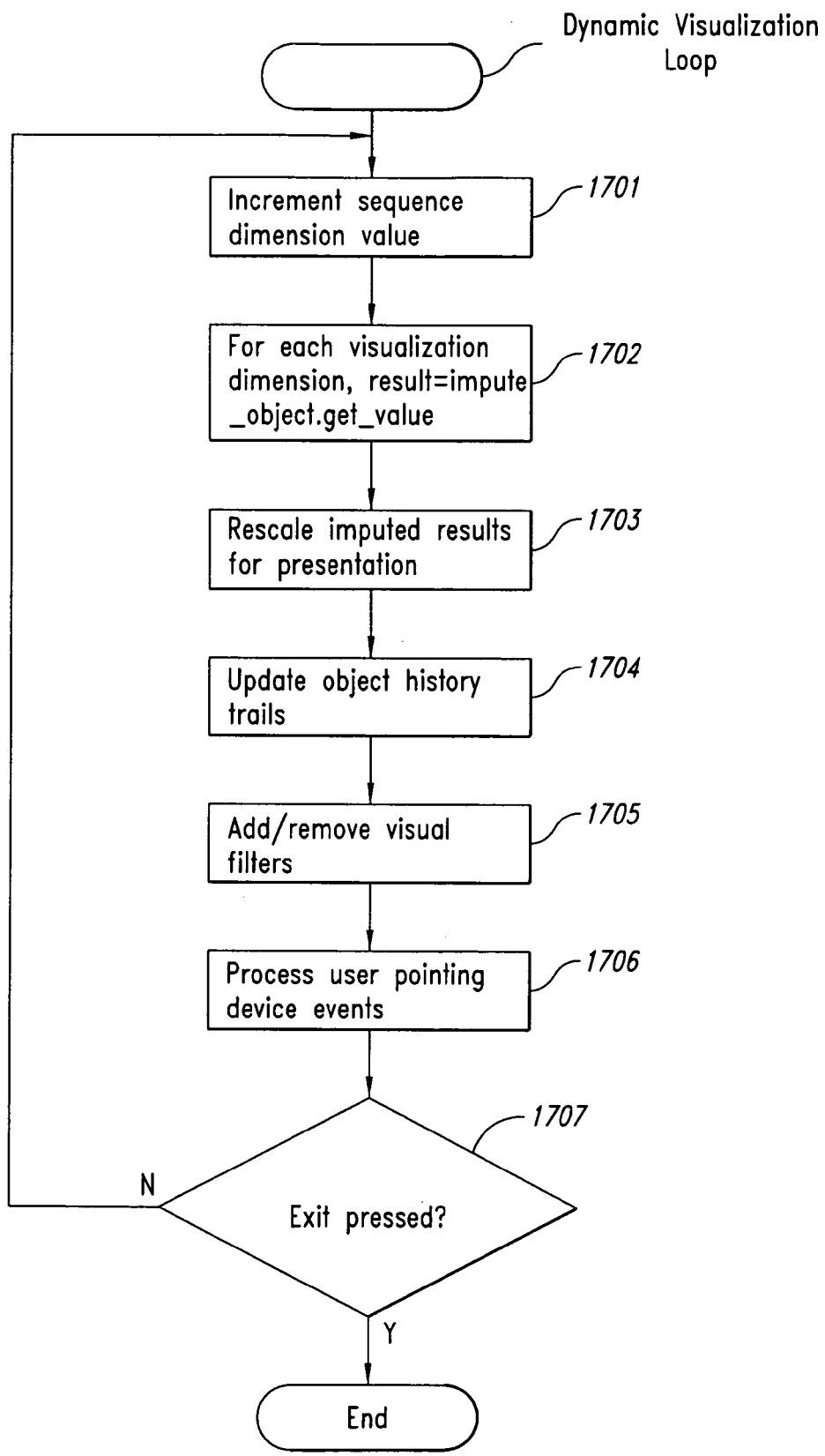
FIG. 17 is an example flow diagram of a dynamic visualization loop.

FIG. 17 is an example flow diagram of a dynamic visualization loop. In step 1701, the dynamic visualization proceeds by incrementing the sequence variable of the execution class object. In step 1702, the value of each data object's attribute that is mapped to a visualization dimension is then obtained by passing the current value of the sequence variable to the each of the imputation objects associated with these data object attributes. Each imputation object returns the imputed value of the attribute for that sequence value.

Once the new values for data object attributes are obtained from the imputation objects, then in step 1703, these values are rescaled for visual display. The spatially mapped attributes are rescaled by a multiplicative constant while the qualitatively mapped attributes (e.g., color) are passed to a routine that assigns a discrete value based on a range of input values (e.g., red may correspond to a range of 1 to 2).

In step 1704, ancillary graphics object associated with the data object, such as object trails, are also updated during the dynamic visualization loop. The object trail, a graphical (typically, line) object, is used to present object history. The trail consists of short line segments connecting each of the "positions" (both spatial and appearance) occupied by the graphics object up to a user specified number of sequence values. The trail maintains the appearance of the object at each sequence value as well as the prior location. The trail has the effect of preserving the near term history of the graphic object.

During each loop of the dynamic visualization loop, the graphical display (or other presentation) is refreshed based on the values of execution class object state variables. Because the dynamic visualization loop of each instance of execution object occurs in its own thread, the values of the state variables of each execution object are changed by changing values of parent state variables. The methods of the DVE object are used to safely change thread attributes. These methods ensure that no thread is trying to use a parameter value while it is being changed.

In step 1705, additional objects, such as a visual filter may be added or removed from the graphical display during each update of the dynamic visualization loop. The visual filter is displayed in one implementation as a partial tiling of the boundary surface. Alternate graphics engines may allow real-time alpha blending in the display space and thus present a translucent surface boundary.

When a visual filter object in the form of a geometric shape is instantiated, data objects crossing its surface (entering and exiting the convex shape) generate an event. In one embodiment, the generated event writes sequence values and data object attribute values to a log file for subsequent analysis. Alternative embodiments may use the surface-crossing event to trigger other activities such as notifications and execution of other code modules.

In step 1706, the loop also processes user interaction events such as those received through a pointing device. If a user clicks on a graphics object (glyph) that corresponds to a data object, an event is generated that either shows or hides the tag label associated with the data object. Alternative activities such as launching a web browser to view an associated URL are easily implemented.

In step 1707, if the exit method is invoked, then the dynamic visualization loop ends at which point the display space is closed and other instantiated objects released; otherwise, the loop continues in step 1701.

Figure 18:
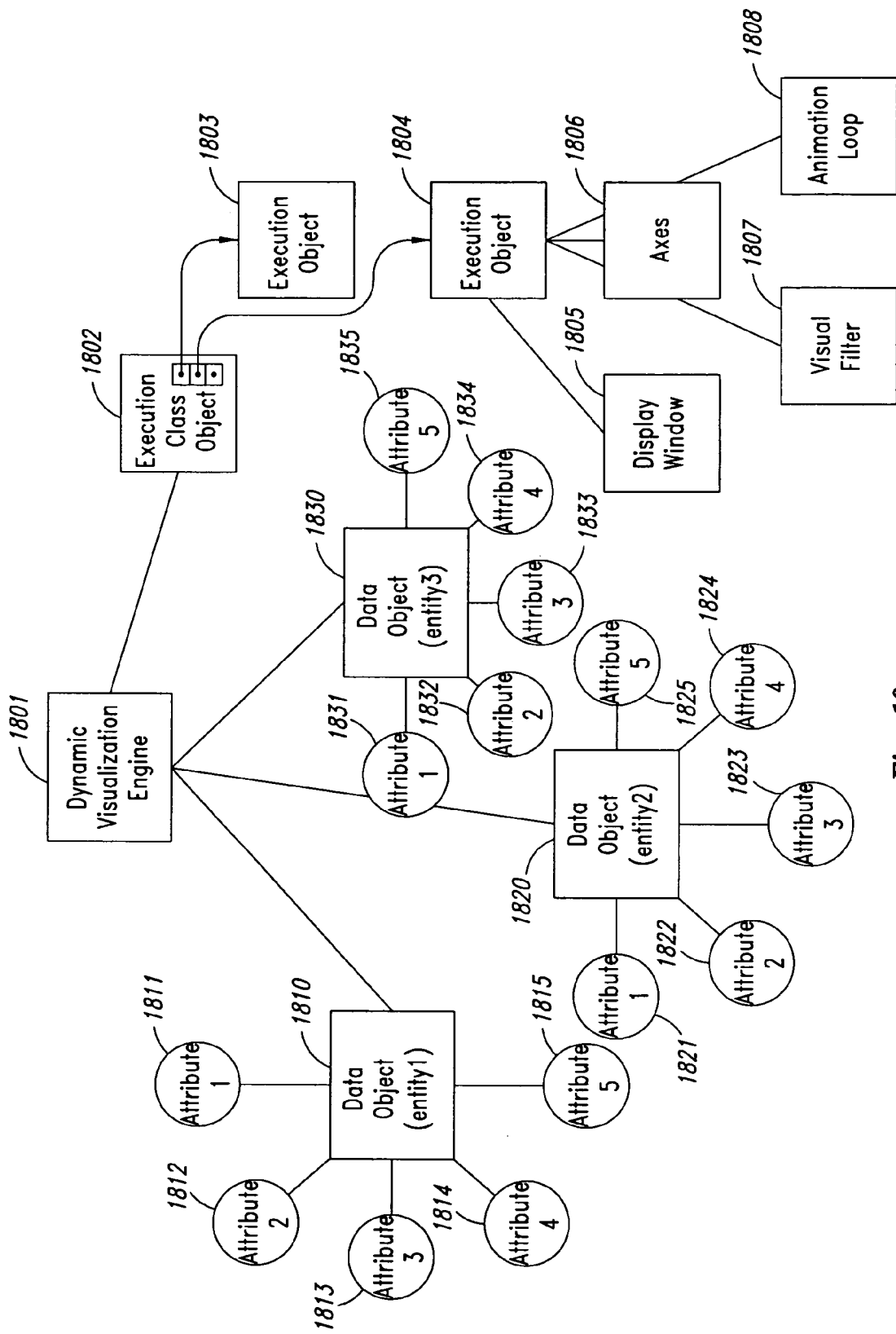
FIG. 18 is an example block summary diagram of the objects that are instantiated as part of a Dynamic Visualization Engine while a visualization is operative.

FIG. 18 is an example block summary diagram of the objects that are instantiated as part of a Dynamic Visualization Engine while a visualization is operative. In FIG. 18, Dynamic Visualization Engine 1801 is instantiated with one or more data objects 1810, 1820, and 1830 as described with reference to FIG. 13. Each of these data objects is associated with one or more imputation objects 1811–15, 1821–25, and 1831–35, which correspond to each attribute mapped to a visualization dimension. The DVE 1801 also instantiates an execution class object 1802, for controlling instances of execution objects 1803 and 1804. Each execution object, for example, execution object 1804, instantiates a display graphics object 1805, one or more axes objects 1806, a visual filter 1807, if used, and a visualization loop 1808.

FIG. 19 is a list of example methods of a Dynamic Visualization Engine object used to access and manage data objects and dynamic visualization presentations. These methods can be invoked by other external programs to "serve" visualizations for use in other applications. Thus, they provide an application programming interface (an "API") to dynamic visualization.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 60/434,219, entitled "METHOD AND SYSTEM FOR VISUALIZING HIGH DIMENSIONAL DATA," filed Dec. 17, 2002, and U.S. Provisional Patent Application No. 60/484,652, entitled "METHOD AND SYSTEM FOR VISUALIZING HIGH DIMENSIONAL DATA," filed Jul. 3, 2003, are incorporated herein by reference, in their entirety.

From the foregoing it will be appreciated that, although specific embodiments of the invention have been described herein for purposes of illustration, various modifications may be made without deviating from the spirit and scope of the invention. For example, one skilled in the art will recognize that the methods and systems for performing dynamic data visualizations discussed herein are applicable to other architectures other than a object-oriented or server architecture. One skilled in the art will also recognize that the methods and systems discussed herein are applicable to differing object-oriented language protocols, graphics primitives, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A method in a computer system for automatically presenting a dynamic visualization of data in a multi-dimensional space of greater than three dimensions, the data having a plurality of attributes, comprising:

receiving a plurality of mappings of data attributes to visualization dimensions, wherein the visualization dimensions include at least one appearance dimension, a plurality of spatial dimensions, and at least one sequencing dimension;

determining a plurality of data entities from the data, each data entity associated with a portion of the data; and for each determined data entity,
  at a time of visualization of the data, automatically and dynamically generating a series of representations of the data entity in the multi-dimensional space and automatically and dynamically presenting the generated series of representations, the representations based upon values of each of the data attributes of the data associated with the data entity that have been mapped to the appearance, spatial, and sequencing dimensions, to portray changes in the data entity over values of the sequencing dimension so that trends in the data can be identified.

2. The method of claim 1 wherein the series of representations includes an indication of a history of changes to the data entity over previous values of the sequencing dimension.

3. The method of claim 2 wherein the history of changes is indicated by a trail from a prior representation of the data entity that corresponds to at least one earlier value of the sequencing dimension to a current value of the sequencing dimension.

4. The method of claim 3 wherein the trail shows movement in at least one spatial dimension.

5. The method of claim 3 wherein the trail shows changes in at least one appearance dimension.

6. The method of claim 3 wherein the length of the trail is proportional to the magnitude of change of the data entity over a period defined by values of the sequencing dimension.

7. The method of claim 1 wherein the sequencing dimension is time and wherein the automatically and dynamically generating the series of representations of the data entity in the multi-dimensional space and automatically and dynamically presenting the generated series of representations portrays changes in the data entity over values of time.

8. The method of claim 1 wherein the automatically and dynamically generating the series of representations of the data entity in the multi-dimensional space, further comprises:
  for each generated representation of the data entity, automatically and dynamically imputing attribute values, based upon a current value of the sequencing dimension, for each attribute of the data associated with the data entity that is mapped to a spatial dimension and for each attribute of the data associated with the data entity that is mapped to an appearance dimension.

9. The method of claim 8 wherein the automatically and dynamically imputing attribute values comprises automatically and dynamically imputing values based upon at least one imputation function derived from the data associated with the data entity.

10. The method of claim 9 wherein the imputation function is an interpolation function.

11. The method of claim 9 wherein the imputation function is at least one of a univariate function of data entity data, a multivariate function of data from a plurality of data entities, and a function that preserves statistical characteristics of data entity data.

12. The method of claim 9 wherein the imputation function imputes a value by examining a plurality of existing data sequences.

13. The method of claim 9 wherein the automatically and dynamically imputing attribute values comprises, for each attribute of the data associated with the data entity that is mapped to at least one of a spatial and an appearance dimension, automatically and dynamically imputing a value based upon a function derived from the data associated with that attribute, wherein at least two attributes impute values based upon different functions.

14. The method of claim 1 wherein the automatically and dynamically generating the series of representations of the data entity in the multi-dimensional space and automatically and dynamically presenting the generated series of representations, further comprises:
  instantiating a data object that corresponds to each data entity, each object having a plurality of instantiated spatial attribute and appearance attribute objects, each attribute object having an instantiated imputation object that computes a value for a visualization dimension dynamically;
  determining a next sequencing dimension value; and
  for each instantiated data object,
    causing each of the instantiated imputation objects to determine an attribute value that corresponds to the next sequencing dimension value; and
    causing the data entity to be presented according to the determined attribute values of the corresponding instantiated data object.

15. The method of claim 14, further comprising:
  repeating the steps of determining the next sequencing dimension value and for each instantiated object, causing each of the instantiated imputation objects to determine the corresponding attribute value and causing the data entity to be presented.

16. The method of claim 1, further comprising:
  determining and presenting a visual filter that defines criteria of interest; and
  indicating when the attribute values of a data entity that are mapped to a visualization dimension intersect with the criteria defined by the visual filter.

17. The method of claim 16, the indicating when the attribute values intersect with the criteria defined by the visual filter, further comprising:
  indicating at least one of that the attribute values intersect with the criteria defined by the visual filter and that the attributes cease to intersect with the criteria defined by the visual filter by triggering an event.

18. The method of claim 17 wherein the event comprises storing an indication of the data entity whose attribute values intersect with the criteria.

19. The method of claim 17 wherein the event comprises at least one of a notification, logged data, and execution of code.

20. The method of claim 16, the determining and presenting the visual filter that defines criteria of interest, further comprising:
  determining and presenting a visual filter that defines at least one region of spatial dimension values.

21. The method of claim 16, the determining and presenting the visual filter that defines criteria of interest, further comprising:
  determining and presenting a visual filter that defines at least one set of appearance dimension values.

22. The method of claim 21 wherein the appearance dimension values comprise at least one of an indication of size, color, glyph, pattern, texture, and shape.

23. The method of claim 1, the determining of the plurality of data entities further comprising:
  receiving an indication of a data attribute of the data that is to be used to select a plurality of data entities; and
  determining a plurality of data entities by associating a unique data entity with each unique value of the indicated data attribute.

24. The method of claim 1, the visualization dimensions further comprising at least one audio dimension, wherein at least one attribute is mapped to the audio dimension, and wherein the automatically and dynamically generating the series of representations of the entity in the multi-dimensional space and automatically and dynamically presenting the generated series of representations, further comprises:

automatically and dynamically generating a series of representations of the data entity in the multi-dimensional space and automatically and dynamically presenting the generated series of representations, the representations based upon values of each of the data attributes of the data associated with the data entity that have been mapped to the appearance, spatial, sequencing, and audio dimensions.

25. The method of claim 1, wherein the appearance dimension is at least one of size, color, glyph, pattern, shape, and texture.

26. The method of claim 1, each spatial and appearance dimension having at least one display parameter, further comprising:

while the series of representations of the data entity are being presented, receiving an indication of a change to the at least one display parameter of at least one of the spatial dimensions and the appearance dimension; and adjusting the presentation of the series of representations of the data entity to account for the indicated change.

27. A computer-readable memory medium containing instructions that, when executed, control a computer processor to automatically present a dynamic visualization of data in a multi-dimensional space of greater than three dimensions, the data having a plurality of attributes, by performing a method comprising:

receiving a plurality of mappings of data attributes to visualization dimensions, wherein the visualization dimensions include at least one appearance dimension, a plurality of spatial dimensions, and at least one sequencing dimension;

determining a plurality of data entities from the data, each data entity associated with a portion of the data; and for each determined data entity, automatically and dynamically generating a series of representations of the data entity in the multi-dimensional space and automatically and dynamically presenting the generated series of representations, the representations based upon values of each of the data attributes of the data associated with the data entity that have been mapped to the appearance, spatial, and sequencing dimensions, to portray changes to the data entity over values of the sequencing dimension so that trends in the data can be identified.

28. The computer-readable memory medium of claim 27 wherein the series of representations includes an indication of a history of changes to the data entity over previous values of the sequencing dimension.

29. The computer-readable memory medium of claim 28 wherein the history of changes is indicated by a trail from a prior representation of the data entity that corresponds to at least one earlier value of the sequencing dimension to a current value of the sequencing dimension.

30. The computer-readable memory medium of claim 29 wherein the trail shows movement in at least one spatial dimension.

31. The computer-readable memory medium of claim 29 wherein the trail shows changes in at least one appearance dimension.

32. The computer-readable memory medium of claim 29 wherein the length of the trail is proportional to the magnitude of change of the data entity over a period defined by values of the sequencing dimension.

33. The computer-readable memory medium of claim 27 wherein the sequencing dimension is time and wherein the automatically and dynamically generating the series of representations of the data entity in the multi-dimensional space and automatically and dynamically presenting the generated series of representations portray changes in the data entity over values of time.

34. The computer-readable memory medium of claim 27 wherein the automatically and dynamically generating the series of representations of the data entity in the multi-dimensional space further comprises:

for each generated representation of the data entity, automatically and dynamically imputing attribute values, based upon a current value of the sequencing dimension, for each attribute of the data associated with the data entity that is mapped to a spatial dimension and for each attribute of the data associated with the data entity that is mapped to an appearance dimension.

35. The computer-readable memory medium of claim 34 wherein the automatically and dynamically imputing attribute values further comprise automatically and dynamically imputing values based upon at least one imputation function derived from the data associated with the data entity.

36. The computer-readable memory medium of claim 35 wherein the imputation function is an interpolation function.

37. The computer-readable memory medium of claim 35 wherein the imputation function is at least one of a univariate function of data entity data, a multivariate function of data from a plurality of data entities, and a function that preserves statistical characteristics of data entity data.

38. The computer-readable memory medium of claim 35 wherein the imputation function imputes a value by examining a plurality of existing data sequences.

39. The computer-readable memory medium of claim 34 wherein the automatically and dynamically imputing attribute values further comprises, for each attribute of the data associated with the data entity that is mapped to at least one of a spatial and an appearance dimension, automatically and dynamically imputing a value based upon a function derived from the data associated with that attribute, wherein at least two attributes impute values based upon different functions.

40. The computer-readable memory medium of claim 27 wherein the automatically and dynamically generating the series of representations of the data entity in the multi-dimensional space and automatically and dynamically presenting the generated series of representations, further comprises:

instantiating a data object that corresponds to each data entity, each object having a plurality of instantiated spatial attribute and appearance attribute objects, each attribute object having an instantiated imputation object that computes a value for a visualization dimension dynamically;

determining a next sequencing dimension value; and for each instantiated data object, causing each of the instantiated imputation objects to determine an attribute value that corresponds to the next sequencing dimension value; and causing the data entity to be presented according to the determined attribute values of the corresponding instantiated data object.

41. The computer-readable memory medium of claim 40 wherein the method further comprises:
repeating the steps of determining the next sequencing dimension value and for each instantiated object, causing each of the instantiated imputation objects to determine the corresponding attribute value and causing the data entity to be presented.

42. The computer-readable memory medium of claim 27 wherein the method further comprises:
determining and presenting a visual filter that defines criteria of interest; and
indicating when the attribute values of a data entity that are mapped to a visualization dimension intersect with the criteria defined by the visual filter.

43. The computer-readable memory medium of claim 42, the indicating when the attribute values intersect with the criteria defined by the visual filter further comprising:
indicating at least one of that the attribute values intersect with the criteria defined by the visual filter and that the attribute values cease to intersect with the criteria defined by the visual filter by triggering an event.

44. The computer-readable memory medium of claim 43 wherein the event comprises storing an indication of the data entity whose attribute values intersect with the criteria.

45. The computer-readable memory medium of claim 43 wherein the event comprises at least one of a notification, logged data, and execution of code.

46. The computer-readable memory medium of claim 42, the determining and presenting the visual filter that defines criteria of interest; further comprising:
determining and presenting a visual filter that defines at least one region of spatial dimension values.

47. The computer-readable memory medium of claim 42, the determining and presenting the visual filter that defines criteria of interest further comprising:
determining and presenting a visual filter that defines at least one set of appearance dimension values.

48. The computer-readable memory medium of claim 47 wherein the appearance dimension values comprise at least one of an indication of size, color, glyph, pattern, texture, and shape.

49. The computer-readable memory medium of claim 27, the determining of the plurality of data entities further comprising:
receiving an indication of a data attribute of the data that is to be used to select a plurality of data entities; and
determining a plurality of data entities by associating a unique data entity with each unique value of the indicated data attribute.

50. The computer-readable memory medium of claim 27, the visualization dimensions further comprising at least one audio dimension, wherein at least one attribute is mapped to the audio dimension, and wherein the automatically and dynamically generating the series of representations of the entity in the multi-dimensional space and automatically and dynamically presenting the generated series of representations further comprise:
automatically and dynamically generating a series of representations of the data entity in the multi-dimensional space and automatically and dynamically presenting the generated series of representations, the representations based upon values of each of the data attributes of the data associated with the data entity that have been mapped to the appearance, spatial, sequencing, and audio dimensions.

51. The computer-readable memory medium of claim 27 wherein the appearance dimension is at least one of size, color, glyph, pattern, shape, and texture.

52. The computer-readable memory medium of claim 27, each spatial and appearance dimension having at least one display parameter, the method further comprising:
while the series of representations of the data entity are being presented,
receiving an indication of a change to the at least one display parameter of at least one of the spatial dimensions and the appearance dimension; and
adjusting the presentation of the series of representations of the data entity to account for the indicated change.

53. A data visualization system for automatically presenting a dynamic visualization of data in a multi-dimensional space of greater than three dimensions, the data having a plurality of data attributes and stored in a data repository, comprising:
an attribute mapping mechanism that is structured to receive a plurality of mappings of data attributes to visualization dimensions, wherein the visualization dimensions include at least one appearance dimension, a plurality of spatial dimensions, and at least one sequencing dimension;
an entity management component that is structured to determine from the data stored in the data repository a plurality of data entities, each data entity associated with a portion of the data, and that instantiates a data object that corresponds to each determined data entity and associated data; and
a visualization execution mechanism that is structured to, for each value of the at least one sequencing dimension, automatically invoke each instantiated data object to automatically and dynamically determine and present a representation of the corresponding data entity in the multi-dimensional space based upon values of each of the data attributes of the data associated with the instantiated data object that have been mapped to the appearance, spatial, and sequencing dimensions.

54. The data visualization system of claim 53 wherein the representation presented by each instantiated data object includes an indication of a history of changes to the data entity over previous values of the sequencing dimension.

55. The data visualization system of claim 54 wherein the history of changes is indicated by a trail from a prior representation of the data entity that corresponds to at least one earlier value of the sequencing dimension to a current value of the sequencing dimension.

56. The data visualization system of claim 55 wherein the trail shows movement in at least one spatial dimension.

57. The data visualization system of claim 55 wherein the trail shows changes in at least one appearance dimension.

58. The data visualization system of claim 55 wherein the length of the trail is proportional to the magnitude of change of the data entity over a period defined by values of the sequencing dimension.

59. The data visualization system of claim 53 wherein the sequencing dimension is time and wherein the representation presented by each instantiated object portrays changes in the corresponding data entity over values of time.

60. The data visualization system of claim 53 wherein each instantiated object automatically and dynamically determines and presents a representation of the corresponding data entity by automatically and dynamically imputing attribute values, based upon a current value of the sequencing dimension, for each attribute of the associated data that is mapped to a spatial dimension and for each attribute of the associated data that is mapped to an appearance dimension.

61. The data visualization system of claim 60 wherein the automatically and dynamically imputing attribute values comprises automatically and dynamically imputing values based upon at least one imputation function derived from the associated data.

62. The data visualization system of claim 61 wherein the imputation function is an interpolation function.

63. The data visualization system of claim 61 wherein the imputation function is at least one of a univariate function of data entity data, a multivariate function of data from a plurality of data entities, and a function that preserves statistical characteristics of data entity data.

64. The data visualization system of claim 61 wherein the imputation function imputes a value by examining a plurality of existing data sequences.

65. The data visualization system of claim 60 wherein the automatically and dynamically imputing attribute values comprises, for each attribute of the associated data that is mapped to at least one of a spatial and an appearance dimension, automatically and dynamically imputing a value based upon a function derived from the data associated with that attribute, wherein at least two attributes impute values based upon different functions.

66. The data visualization system of claim 53, wherein the automatically and dynamically imputing attribute values for each instantiated data object is performed by invoking a plurality of imputation objects that correspond to the instantiated data object, each imputation object corresponding to a data attribute of the data associated with the data object that has been mapped to a visualization dimension.

67. The data visualization system of claim 53, further comprising:
a visual filter that is structured to define criteria of interest and to indicate when the attribute values of a data entity that are mapped to a visualization dimension at least one of intersect and cease to intersect with the criteria defined by the visual filter.

68. The data visualization system of claim 67 wherein the visual filter indicates when the attribute values intersect with the criteria defined by the visual filter by triggering an event.

69. The data visualization system of claim 68 wherein the event comprises storing an indication of the data entity whose attribute values intersect with the criteria.

70. The data visualization system of claim 68 wherein the event is at least one of a notification, logged data.

71. The data visualization system of claim 67 wherein the visual filter defines criteria of interest by defining at least one region of spatial dimension values.

72. The data visualization system of claim 67 wherein the visual filter defines criteria of interest by defining at least one set of appearance dimension values.

73. The data visualization system of claim 72 wherein the appearance dimension values comprise at least one of an indication of size, color, glyph, pattern, texture, and shape.

74. The data visualization system of claim 53 wherein the entity management component determines the plurality of data entities by receiving an indication of a data attribute of the data that is to be used to select a plurality of data entities and associating a unique data entity with each unique value of the indicated data attribute.

75. The data visualization system of claim 53, the visualization dimensions further comprising at least one audio dimension, wherein the attribute mapping mechanism receives a mapping of at least one attribute to the audio dimension, and wherein the representations of the data entity presented by each instantiated data object are also based upon values of the data attribute of the associated data of each data object that has been mapped to the audio dimension.

76. The data visualization system of claim 53, wherein the appearance dimension is at least one of size, color, glyph, pattern, shape, and texture.

77. The data visualization system of claim 53, each spatial and appearance dimension having at least one display parameter, wherein the visualization execution mechanism is further structured to, while the series of representations of each data entity are being presented by each data object,
receive an indication of a change to the at least one display parameter of at least one of the spatial dimensions and the appearance dimension; and
forward the indicated change to each instantiated data object so each data object accordingly adjusts the representations of the data entity to account for the indicated change when presented.

78. A method in a computer system for visually indicating data of interest from among multi-dimensional data, comprising:
displaying a dynamic visualization of the multi-dimensional data;
defining a visual filter that defines criteria of interest by specifying a range of values for at least one of an appearance dimensions and a spatial dimension;
displaying delineations of at least one convex region, the displayed delineations indicating the defined criteria of interest; and
upon receiving an indication that values of the multi-dimensional data displayed in the dynamic visualization intersect with the defined criteria of interest, displaying a representation of the multi-dimensional data having the indicated values within the displayed delineated region.

79. The method of claim 78 wherein the delineated region is a convex geometric shape.

80. The method of claim 79 wherein the convex geometric shape is at least one of an ellipsoid, a sphere, and a rectangle.

81. The method of claim 78 wherein the display of the delineations displays at least one of a frame and an outline.

82. The method of claim 78, further comprising: receiving an indication that the values of the multi-dimensional data displayed in the dynamic visualization cease to intersect with the defined criteria of interest; and
triggering an event.

83. The method of claim 78 wherein the criteria of interest is a set of values of an appearance dimension.

84. The method of claim 83 wherein the appearance dimension is at least one of a size, color, pattern, texture, shape, and glyph.

85. The method of claim 78 wherein the criteria of interest defines sets of ranges for each of three spatial dimensions.

86. The method of claim 78, further comprising:
upon receiving the indication that values of the multi-dimensional data displayed in the dynamic visualization intersect with the defined criteria of interest, triggering an event.

87. The method of claim 86 wherein the event is at least one of a notification, logged data, and execution of code.

88. The method of claim 86 wherein the event is storing an indication of the data whose values intersect with the defined criteria of interest.

89. The method of claim 78 wherein the displayed dynamic visualization of the multi-dimensional data is an animated display of multi-dimensional data over a sequence of values.

90. The method of claim 78 wherein the displayed dynamic visualization of the multi-dimensional data is portrayal of multi-dimensional data over a sequence of values.

91. A computer-readable memory medium containing instructions that, when executed, control a computer processor to visually indicate data of interest from among displayed multi-dimensional data, by performing a method comprising:
    displaying a dynamic visualization of the multi-dimensional data;
    defining a visual filter that defines criteria of interest by specifying a range of values for at least one of an appearance dimensions and a spatial dimension;
    displaying delineations of at least one convex region, the displayed delineations indicating the defined criteria of interest; and
    upon receiving an indication that values of the multi-dimensional data displayed in the dynamic visualization intersect with the defined criteria of interest, displaying a representation of the multi-dimensional data having the indicated values within the displayed delineated region.

92. The computer-readable memory medium of claim 91 wherein the delineated region is a convex geometric shape.

93. The computer-readable memory medium of claim 92 wherein the convex geometric shape is at least one of an ellipsoid, a sphere, or a rectangle.

94. The computer-readable memory medium of claim 91 wherein the display of the delineations displays at least one of a frame or an outline.

95. The computer-readable memory medium of claim 91, the method further comprising:
    receiving an indication that the values of the multi-dimensional data displayed in the dynamic visualization cease to intersect with the defined criteria of interest; and
    triggering an event.

96. The computer-readable memory medium of claim 91 wherein the criteria of interest is a set of values of an appearance dimension.

97. The computer-readable memory medium of claim 96 wherein the appearance dimension is at least one of a size, color, pattern, texture, shape, or glyph.

98. The computer-readable memory medium of claim 91 wherein the criteria of interest defines sets of ranges for each of three spatial dimensions.

99. The computer-readable memory medium of claim 91, the method further comprising:
    upon receiving the indication that values of the multi-dimensional data displayed in the dynamic visualization intersect with the defined criteria of interest, triggering an event.

100. The computer-readable memory medium of claim 99 wherein the event is at least one of a notification, logged data or execution of code.

101. The computer-readable memory medium of claim 99 wherein the event is storing an indication of the data whose values intersect with the defined criteria of interest.

102. The computer-readable memory medium of claim 91 wherein the multi-dimensional data displayed in the dynamic visualization is an animated display of multi-dimensional data over a sequence of values.

103. The computer-readable memory medium of claim 91 wherein the multi-dimensional data displayed in the dynamic visualization is a portrayal of multi-dimensional data over a sequence of values.

104. A computer-based visual filter for visually indicating data of interest from among multi-dimensional data, comprising:
    input mechanism that defines criteria of interest by receiving an indication of a range of values for at least one of an appearance dimensions and a spatial dimension;
    a display mechanism that is structured to,
        display a dynamic visualization of the multi-dimensional data;
        display a convex delineation, the displayed delineation indicating the defined criteria of interest; and
        upon receiving an indication that values of the multi-dimensional data displayed in the dynamic visualization intersect with the defined criteria of interest, display a representation of the multi-dimensional data having the indicated values within the displayed delineation.

105. The visual filter of claim 104 wherein the delineation is a convex geometric shape.

106. The visual filter of claim 105 wherein the convex geometric shape is at least one of an ellipsoid, a sphere or a rectangle.

107. The visual filter of claim 104 wherein the display of the geometric shape displays at least one of a frame or an outline.

108. The visual filter of claim 104 wherein the display mechanism is further structured to indicate that values of the displayed multi-dimensional data cease to intersect with the defined criteria of interest.

109. The visual filter of claim 108 wherein the indication is a triggered event.

110. The visual filter of claim 104 wherein the criteria of interest is a set of values of an appearance dimension.

111. The visual filter of claim 110 wherein the appearance dimension is at least one of a size, color, pattern, texture, shape, or glyph.

112. The visual filter of claim 104 wherein the criteria of interest defines sets of ranges for each of three spatial dimensions.

113. The visual filter of claim 104, further comprising:
    an alert mechanism that, upon receiving the indication that values of the multi-dimensional data displayed in the dynamic visualization intersect with the defined criteria of interest, triggers an event.

114. The visual filter of claim 113 wherein the event is at least one of a notification, logged data, and execution of code.

115. The visual filter of claim 113 wherein the event is storing an indication of the data whose values intersect with the defined criteria of interest.

116. The visual filter of claim 104 wherein the multi-dimensional data displayed in the dynamic visualization is an animated display of multi-dimensional data over a sequence of values.

117. The visual filter of claim 104 wherein the multi-dimensional data displayed in the dynamic visualization is a portrayal of multi-dimensional data over a sequence of values.

* * * * *